United States Patent [19]

Krause et al.

[11] Patent Number: 5,535,338
[45] Date of Patent: Jul. 9, 1996

[54] MULTIFUNCTION NETWORK STATION WITH NETWORK ADDRESSES FOR FUNCTIONAL UNITS

[75] Inventors: Jeffrey Krause, Los Altos; Niles E. Strohl, Tracy; Michael J. Seaman, San Jose; Steven P. Russell, Menlo Park; John H. Hart, Saratoga, all of Calif.

[73] Assignee: 3Com Corporation, Santa Clara, Calif.

[21] Appl. No.: 452,498

[22] Filed: May 30, 1995

Related U.S. Application Data

[62] Division of Ser. No. 98,616, Jul. 28, 1993.

[51] Int. Cl.$^6$ .................................................. G06F 13/00
[52] U.S. Cl. ............... 395/200.20; 395/800; 370/94.3; 364/228.5; 364/241.9; 364/242.95; 364/DIG. 1
[58] Field of Search .................. 395/200.01, 200.11, 395/200.16, 200.20, 287, 728, 800, 829, 858; 370/54, 60, 92, 94.3; 371/8.2, 11.2; 340/825.06, 825.07

[56] References Cited

U.S. PATENT DOCUMENTS

| | | | |
|---|---|---|---|
| 4,652,874 | 3/1987 | Loyer | 340/825.05 |
| 4,692,918 | 9/1987 | Elliott et al. | 370/85 |
| 4,930,123 | 5/1990 | Shimizu | 370/94.1 |
| 5,058,110 | 10/1991 | Beach et al. | 370/85.6 |
| 5,058,163 | 10/1991 | Lubarsky et al. | 380/49 |
| 5,095,381 | 3/1992 | Karol | 359/123 |
| 5,148,433 | 9/1992 | Johnson et al. | 371/11.3 |
| 5,307,413 | 4/1994 | Denzer | 380/49 |
| 5,319,752 | 6/1994 | Petersen et al. | 395/250 |
| 5,321,819 | 6/1994 | Szczepanek | 395/200.2 |
| 5,379,289 | 1/1995 | DeSouza et al. | 370/85.13 |

FOREIGN PATENT DOCUMENTS

| | | |
|---|---|---|
| 0222584A2 | 5/1987 | European Pat. Off. |
| 0522743A1 | 1/1993 | European Pat. Off. |

*Primary Examiner*—Alpesh M. Shah
*Attorney, Agent, or Firm*—Haynes & Davis

[57] ABSTRACT

DLL devices are built with multiple MAC address instead of a single MAC address, and provide a multiple virtual DLL interfaces to the upper layers (3-7) in a computer. This results in a new class of multi-function computers for attachment to a network system which take advantage of the multiple virtual DLL interfaces, to increase performance of the respective functions executed by the computer. Thus, a new network interface control apparatus and a new class of multi-function computer systems for attachments to networks are provided. The memory in the medium access control device stores a plurality of additional network addresses in addition to the assigned network addresses. The address filtering logic includes circuits responsive to the additional network addresses, such as logic for blocking a particular frame on at least one of the plurality of data channels when the source and destination address of a particular frame are found in the additional addresses stored in the memory. The plurality of data channels served by the media access control device may reside on a single physical interface, or in independent physical interfaces as suits the needs of a particular design. A high performance design would include independent buffering and queuing structures for each of the data channels. An alternative design may include shared buffering and queuing structures for a plurality of functional modules in the connected computer which have independent side network addresses.

23 Claims, 16 Drawing Sheets

MEDIA ARB AUI

FIG. 13 MEDIA ARB 10 BASE T

MULTIFUNCTION NETWORK STATION WITH NETWORK ADDRESSES FOR FUNCTIONAL UNITS

This application is a divisional of application Ser. No. 08/098,616, filed Jul. 28, 1993.

BACKGROUND OF THE INVENTION

1. Field of the Invention

The present invent ion relates to local area networks, and more particularly to network interfaces for multi-function computer systems.

2. Description of Related Art

Today, Local Area Networks (LANs) are connected together with computers such as Local or Remote Bridges, Routers, Bridge-Router hybrids known as BRouters, or Boundary Routers (see U.S. patent application by John Hart, Ser. No. 07/871,113, Filed Apr. 20, 1992, now abandoned, entitled SYSTEM FOR EXTENDING NETWORK RESOURCES TO REMOTE NETWORKS). All of these computers which connect LANs together are known as Intermediate Systems (IS Computers). (*Extending the IEEE 802.1 MAC Bridging Standard to Remote Bridges,* John Hart, IEEE Network, The Magazine of Computer Communications, January 1988, Vol. 2, No. 1; and *Integrating Bridges and Routers in a Large Internetwork,* Eric Benhamou, IEEE Network, The Magazine of Computer Communications, January 1988, Vol. 2, No. 1).

Attached to the bAN are personal computers (PCs), minicomputers, mainframes, printers, and other devices known as End Systems (ES Computers).

The operation of a network is usually described in terms of the OSI model (*Carrier Sense Multiple Access with Collision Detection,* IEEE Std 802.3-1985; and *Token Ring Access Method and Physical Layer Specifications,* IEEE Std 802.5-1985). This is a description of technology in terms of 7 layers, ranging from the physical layer (OSI layer 1) including the medium or wire strung between machines, to the software applications such as Claris's Filemaker Pro® Database software (OSI layer 7) (Filemaker is a registered trademark of the Claris Corporation of Santa Clara, Calif.). To allow interoperability between vendors, and simplify the design and creation of networking products, most networking products are designed in terms of these layers. For example, devices at the data link layer (OSI layer 2) almost never have the wire built in, but instead have a connector which allows some other vendors wire to be attached.

Layer 1 of the OSI model is the physical layer. This includes the transmission medium, typically the wiring infrastructure, that is run between devices, such as telephone wire, coax cable, or fiber optic cable. At this level the data being shared across a network is viewed in terms of electrical transmission signals, such as square waves, serial bit streams, or parallel bit streams.

The second layer of the OSI model is the data link layer (DLL). This is the layer that describes devices which connect to the actual wire, such as Network Adapter cards. The portion of the devices which place data frames onto the wire or cable, and which arbitrate among devices that share a single wiring scheme is called the Media Access Control (MAC) portion of the DLL. At this level data is viewed in terms of packets or frames, which contain a well defined header containing a source (originator) and destination (target) address. Data being shared is also in the packet but is not understood by layer 2 devices in terms of what the content or meaning of the data is.

The third and fourth layers of the OSI model are the Network Layer and Transport Layer. Due to the development of many products before the standardization of the OSI model, many products blur these two layers together in terms of implementation. From the point of view of this patent, these two layers are where a decision on which DLL device to send the data to occurs if there is more than one connection in the device, in which the appropriate packet header is determined based on the DLL choices, and in which passing or forwarding data to another computer is managed. Because of the lack of standardization in the early days of networking, today there are a number of different products at these layers, usually referred to as Network Protocols or Protocol Suites. Examples are the TCP/IP protocol suite (*DDN Protocol Handbook,* Volume 2, DARPA Internet Standard, December 1985) and the XNS protocol suite (*Internet Transport Protocols,* Xerox System Integration Standard, XSIS 028112, December 1981; and *MS-DOS Internal Network Driver Scheme (MINDS),* Version 1, 3Com Corporation, January, 1984).

The fifth, sixth, and seventh layers of the OSI model are not relevant to this invention except as they benefit from the increased performance of computers which use the invention.

The DLL technology which connects a computer to the LAN is usually referred to as a Network Interface Controller (NIC). Examples of NIC devices are the Intel 586 Ethernet Controller (Intel Corporation, Santa Clara, Calif.), the IBM & National TROPIC TokenRing Controller (National Semiconductor, Santa Clara, Calif.), and the 3Com Vulcan Ethernet Controller (3Com Corporation, Santa Clara, Calif.). Each NIC is configured with a unique, single address MAC address which was assigned by the manufacturer of the NIC during the manufacturing process from a pool of network addresses assigned to the manufacturer by a standards body.

The MAC addresses used in packets at the DLL are identifiable as being either single destination addresses or group addresses. In the most common data link technologies such as Token Ring and Ethernet, this is done by setting the first address bit placed on the physical media to 1 to denote group addresses, or to 0 to denote single destination addresses. Packets in which the destination address is a single destination address are called Unicasts and are used when only a single IS/ES computer which has been assigned that MAC address is intended to receive that packet. Packets in which the destination address is a group address are called Multicasts and are used when a packet is intended to be received by all or a group of IS/ES computers.

Most NICs are designed so that the upper layers on the computer get all multicasts plus any unicasts with that ES's unique address as the destination address of the unicast. This allows the upper layers of software on an ES to only process single address packets which are targeted for that ES, and to be able to filter (block or pass) at the DLL data that is intended for another computer.

When one ES computer wishes to exchange data with another ES computer, they must first discover each others' MAC addresses. This process is called Name resolution. Typically, the first computer sends a special multicast containing its unique MAC address and the upper layer name of the second ES. This is received by all ES computers, but only the ES computer which has the correct upper layer name responds directly to the originating ES. It does so with a unicast to the first computer containing its MAC address so that the two computers can exchange unicasts from that point on. A variant of this exchange is the concentration of the name resolution process into a name or locator server, which acts on behalf of the computers on the LAN, and responds on behalf of the end system. After identification has been established, unicasts containing each others unique MAC address are used, allowing the NIC at each device to accept directed packets for itself and ignore (block at the data link layer) directed packets intended for other computers.

ES computers with multiple protocol suites such as TCP/IP and XNS operating concurrently are constructed most often with a shared NIC, and upper layer software such as the Protocol Manager defined in the Network Device Driver Specification (NDIS) (*Network Device Driver Interface Specification,* Version 2.0, 3Com Corporation and Microsoft Corporation, 1989) requesting each protocol to look at the packet and determine if it is for that module or not, repeating the process until a protocol module identifies the packet. This methodology is referred to as Round-Robin Packet Identification (RRPI).

IS devices which connect multiple LAN's together transparently to ES computers at OSI layers 2 and above are called Bridges. Bridges can not take advantage of the ability to differentiate packets at the MAC layer, and operate in a fashion called promiscuous mode in which all packets regardless of MAC address are accepted. This is done in order to be able to learn which ES and IS devices are connected to the LAN so as to properly transfer packets to and from other LANs.

IS devices which connect multiple LAN's together by cooperating with ES computers at layers 2 to 4 are called Routers. These devices do not need to use promiscuous mode as they only forward packets to other LANs that are addressed to them by the originating ES computers. However, because of the large number of protocols and environments in which routing does not work, most routers today also have to support bridging and thus must use promiscuous mode. Computers which perform both Bridging and Routing functions are known as BRouters. Most full function router products on the market today are in fact Brouters.

Computers which have both IS and ES functionality are for the most part protocol specific and support only routed protocols because of the processing overhead of "promiscuous mode" that bridging requires. In these computers, protocol identification occurs in software as described above with NDIS, and then at routing layer 3 of each protocol further identification occurs to determine if the packet is for the ES portion of the device or the IS portion. There are several products available today which provide this integration of IS and ES functionality into single computers, such as *PhoneNet Liaison* for Macintosh computers, available through Farallon Computing, Inc., (Alameda, Calif.), and 3+*Open Internet for OS/2 LAN Manager* for PC computers, available through 3Com Corporation.

All of these integrated IS/ES computers today work by sharing the layer 1 and 2 components, and then having the layer 3 and 4 software on the ES determine if the packet is destined for the ES module and thus passed to upper layer software for processing, or if the data is destined for the IS module and handled at that level. Group address packets often have to be handled by both modules.

Benefits of integrated IS/ES computers include cost savings of the equipment, and a reduction of the number of computers in the network with its resulting increase of network reliability and manageability. However, there are also problems with this approach. First, because routing decisions are protocol specific and protocols are very large in terms of code space and complexity, most implementations support only one or perhaps two protocols. Second, software changes are problematic as they require changes to an integrated IS/ES protocol suite. Therefore much more testing is required and the updates are larger in scope. Third, most products can not perform bridging functionality because the processing cost of looking at every packet on the LAN is too great for the ES CPU to do and still be able to handle ES functions such as database management or file system management. In addition, there are occasionally software errors and defects in application software executing on ES devices unrelated to the protocol layers which can adversely affect the performance of the IS functions, and thus indirectly affect many other ES devices in the network which depend on the IS functionality.

As described above, computers have a single unique MAC address assigned to them which is used at the data link layer to identify the computer and to block out packets which are not intended for the computer. This works acceptably for simple ES computers and for IS computers which route (and do not bridge). It does not work as well for integrated IS/ES devices, or for IS devices in which bridging occurs. For both of these applications devices today must do significant processing at high layers of software. In addition, in a network with a large number of computers the amount of processing an ES computer has to do with multicasts, most of which are just ignored, can be significant.

SUMMARY OF THE INVENTION

The present invention builds DLL devices with multiple MAC addresses instead of a single MAC address, and provides multiple virtual DLL interfaces to the upper layers (3–7) in a computer. This results in a new class of multi-function computers for attachment to a network system which takes advantage of the multiple virtual DLL interfaces, to increase performance of the respective functions executed by the computer. Thus, a new network interface control apparatus and a new class of multi-function computer systems for attachments to networks are provided.

The network interface control apparatus according to the present invention includes a connector for transporting data to and from the network transmission medium, and a medium access control device coupled to the connector. The medium access control device receives and transmits frames of data through the connector, and includes a plurality of data channels to communicate with respective processing modules in a connected computer. Memory in the medium access control device stores a plurality of assigned network addresses for the plurality of data channels. Address filtering logic in the device is coupled to the plurality of data channels and to the memory, and passes and blocks frames received through the connector for the plurality of data channels in response to the respective assigned network addresses.

According to one enhancement, the memory in the medium access control device stores a plurality of additional network addresses in addition to the assigned network addresses. The address filtering logic includes circuits responsive to the additional network addresses, such as logic for blocking a particular frame on at least one of the plurality of data channels when the source and destination address of a particular frame are found in the additional addresses stored in the memory.

The plurality of data channels served by the media access control device may reside on a single physical interface, or in independent physical interfaces as suits the needs of a particular design. A high performance design would include independent buffering and queuing structures for each of the data channels. An alternative design may include shared buffering and queuing structures for a plurality of functional modules in the connected computer which have independent, assigned network addresses.

The network interface control apparatus for certain types of network transmission media will include a media arbitration circuit coupled between the connector and the medium access control device. This circuit supplies to the address filtering logic frames which are received through the connector from the network transmission medium, and frames which are to be transmitted to the network transmission medium from the plurality of data channels. Thus, the network interface control apparatus receives frames which are transmitted by it, so that the independent functional modules having separate network addresses, may process communications from other functions sharing the network interface control apparatus.

Alternatively, the present invention can be characterized as a network interface control apparatus which comprises a physical layer device to transport data frames to and from the network transmission medium, and a plurality of virtual data link layer modules coupled to the physical layer device. The virtual data link layer modules include a corresponding plurality of data channels to respective higher protocol layer modules in the connected computer, memory to store assigned network addresses for the plurality of virtual data link layer modules, and address filtering logic coupled to the physical layer device, the plurality of data channels and to the memory, which passes and blocks data frames received from the physical layer device for the plurality of virtual data link layer modules in response to the assigned network addresses. In one aspect of the invention, the physical layer device includes a circuit which merges the plurality of data channels of the corresponding plurality of virtual data link layer modules, into a single data path for connection to the network transmission medium.

Thus, to higher protocol layer modules in the computer, independent data link layer interfaces are presented, which share address filtering logic and physical layer circuitry, and which receive transmissions from the other higher layer modules in the computer.

As mentioned above, the present invention can also be characterized as a new class of multi-function computer system. The computer system according to this aspect of the invention includes a network interface coupled to the network transmission medium, which includes at least a first processor interface having a first assigned network address, and a second processor interface having a second assigned network address. First processing resources are coupled to the first processor interface which receive and transmit frames through the network interface. Further, second processing resources are coupled to the second processor interface which receive and transmit frames through the network interface.

The first and second processing resources may comprise a main CPU executing end system procedures, and a co-processor CPU which executes intermediate system functions. Alternatively, the first and second processing resources may comprise separate protocol suites executed by a single CPU. The first and second processor interfaces may include respective buffering and queuing structures for communication of data between the network transmission medium and the first and second processing resources, or may share a single buffering and queuing structure.

As described above, one aspect of the invention comprises presenting the first and second processor interfaces as respective virtual data link layer interfaces to the higher layer functions executed by the computer system. Further, the system may be configured such that one of the first and second processor interfaces comprises a plurality of virtual data link layer interfaces having respective assigned network addresses.

In another aspect, the present invention presents a new class of integrated end system/intermediate system computers. This new class of IS/ES computers is based on the network interface having a plurality of assigned network addresses. Thus, the device may include a first network interface coupled to a first network transmission medium, which includes at least the first processor interface having a first assigned network address and a second processor interface having a second assigned network address. A first processor is coupled to the first processor interface, and includes network end system resources. A second processor is coupled to the second processor interface, and includes at least a second network interface coupled to a second network transmission medium. The second processor executes network intermediate system resources for transporting frames between the first and second network interfaces for transmission across the first and second network transmission media. Thus, the second processor may provide "routing adaptor" functions as described herein. Also, this system may be expanded to present any number of ports to network transmission media on the second processor, such that it executes bridging, routing, and Brouting functions. Further, these intermediate system functions are executed without interfering with the network end system resources executed on the first processor.

In yet another aspect, a new class of multi-media system has been provided which includes a multiple MAC address network interface controller providing a first virtual data link layer interface to a main CPU and a second virtual data link layer interface to a multi-media module which handles high volumes of audio and video data. The audio and video data can be transmitted through the network to or from the multi-media module based on the unique MAC address of the module, and without the overhead associated with higher level protocols used to communicate with the main processing module or other end systems in the network.

In sum, there are four basic network interface aspects to the invention. The first is to use multiple MAC addresses to a data link layer device and do address blocking or passing on this set rather than on just one address. The second aspect of the invention is to have virtual DLL's by the creation of single data link layer devices which appear as multiple separate data link layer devices to the upper layers of the computer. The third aspect of the invention is the media arbitration methodology required when a single data link layer device is emulating more than one device. The fourth aspect to the invention is the methodology to receive a packet while it is being transmitted.

Furthermore, a new class of multi-function computer system, a high performance integrated IS/ES product and a new multi-media system have been provided based on the virtual data link layer technology.

Other aspects and advantages of the present invention can be seen upon review of the figures, the detailed description, and the claims which follow.

DETAILED DESCRIPTION OF THE PREFERRED EMBODIMENTS

Figure 1:
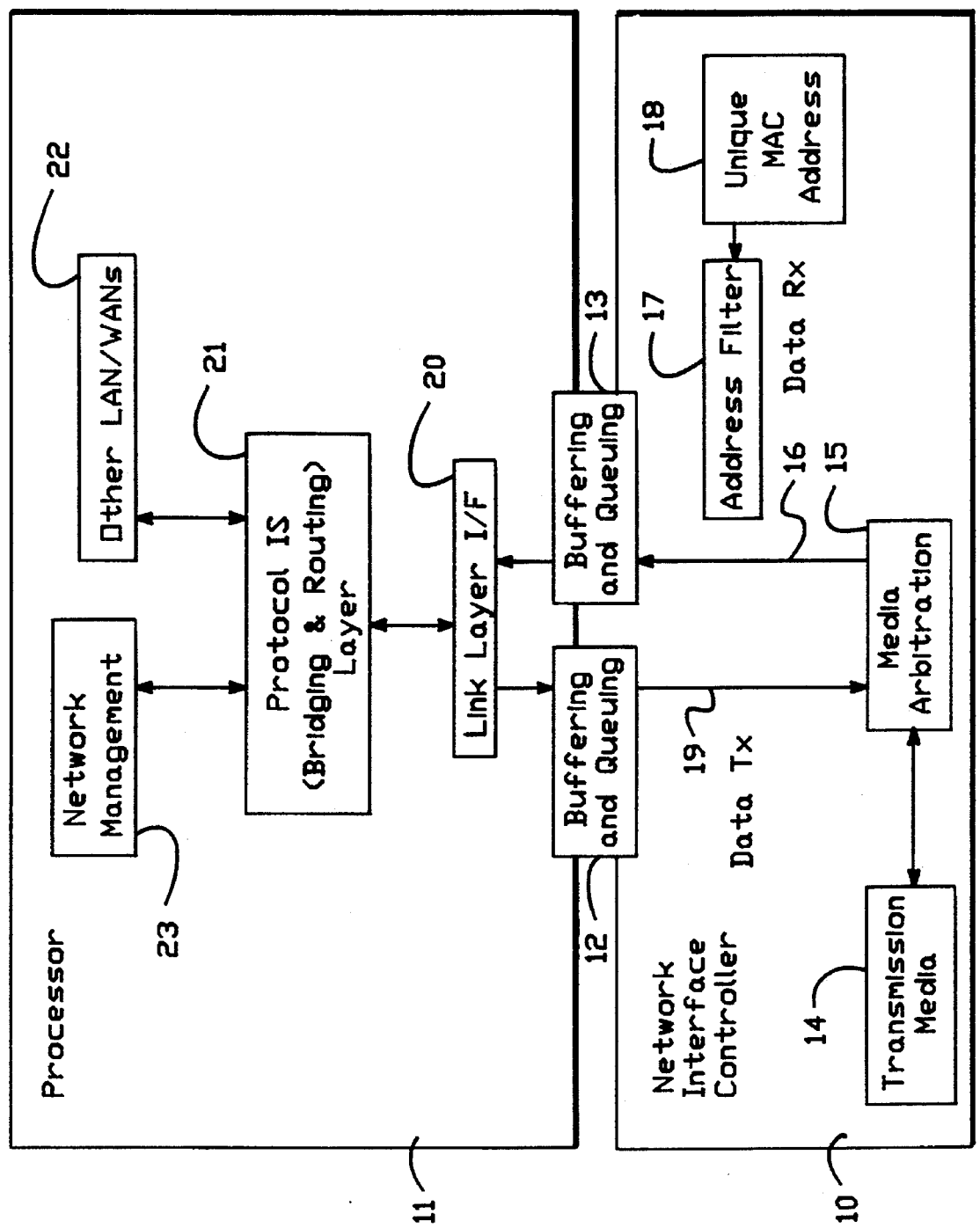
FIG. 1 is a functional block diagram of a prior art network intermediate system.
Figure 2:
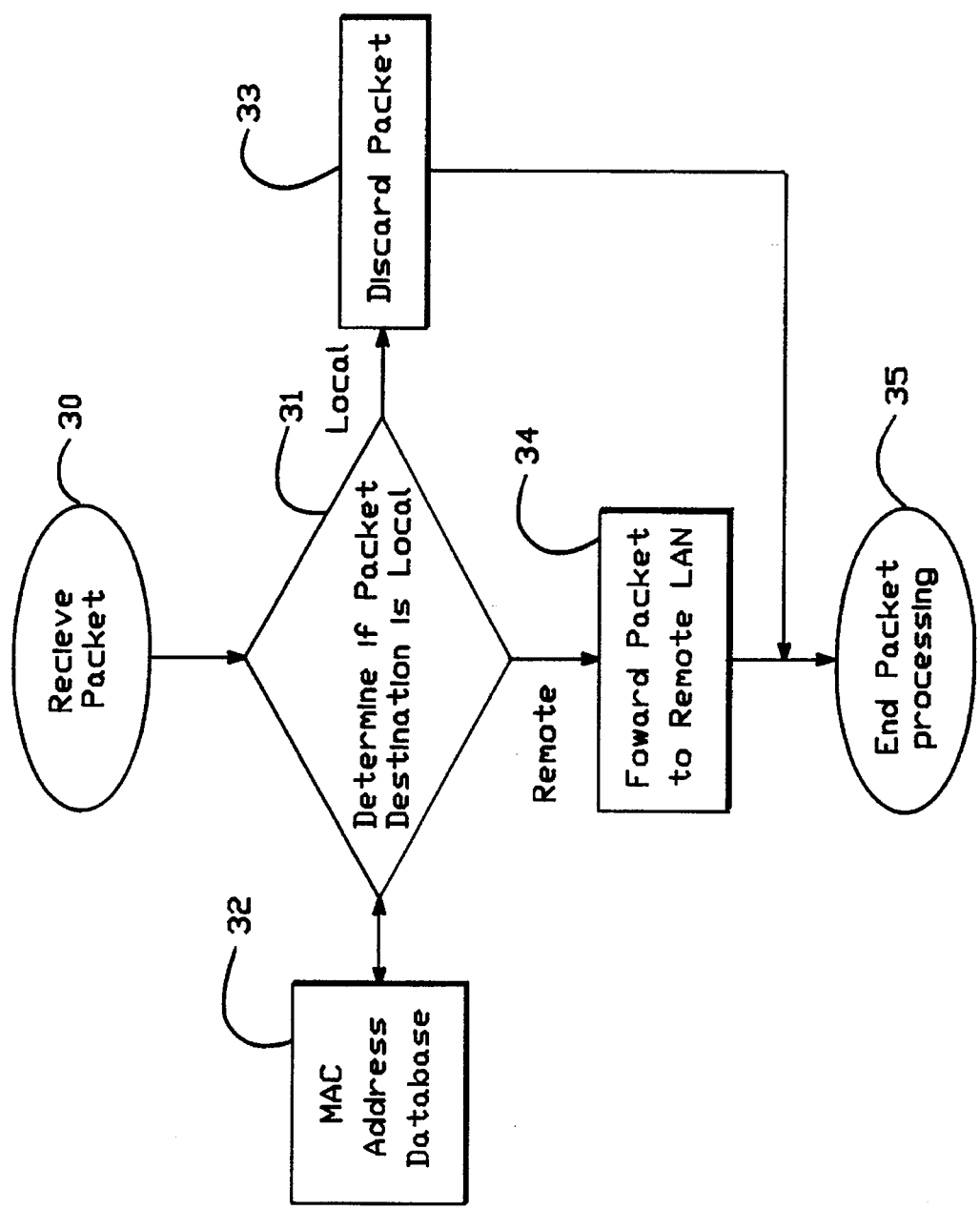
FIG. 2 is a flow chart of a software algorithm for the bridging section of the prior art intermediate system of FIG. 1.
Figure 4:
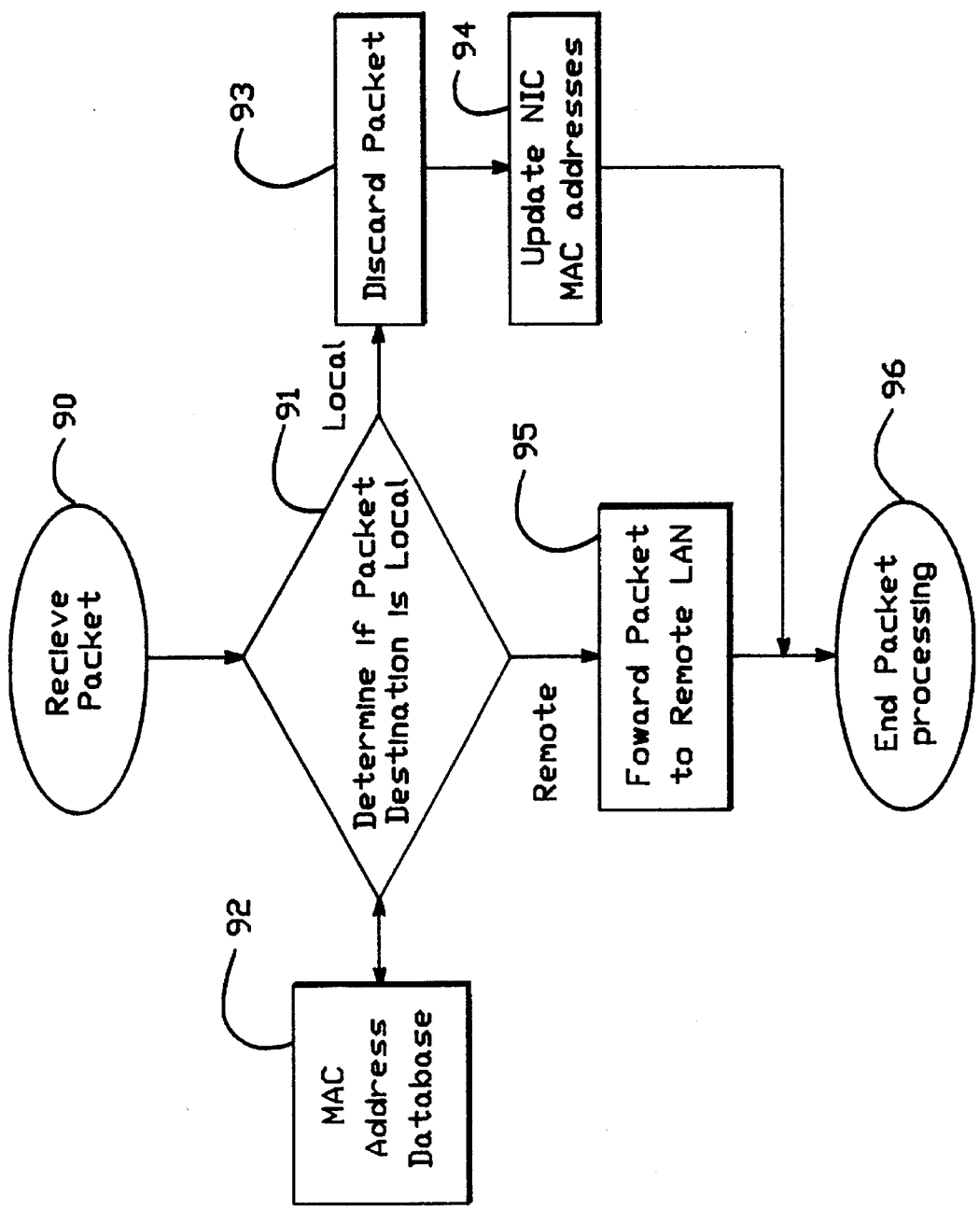
FIG. 4 is a flow chart for the software algorithm of the bridging function of the intermediate system of FIG. 3 adapted according to the present invention.
Figure 5:
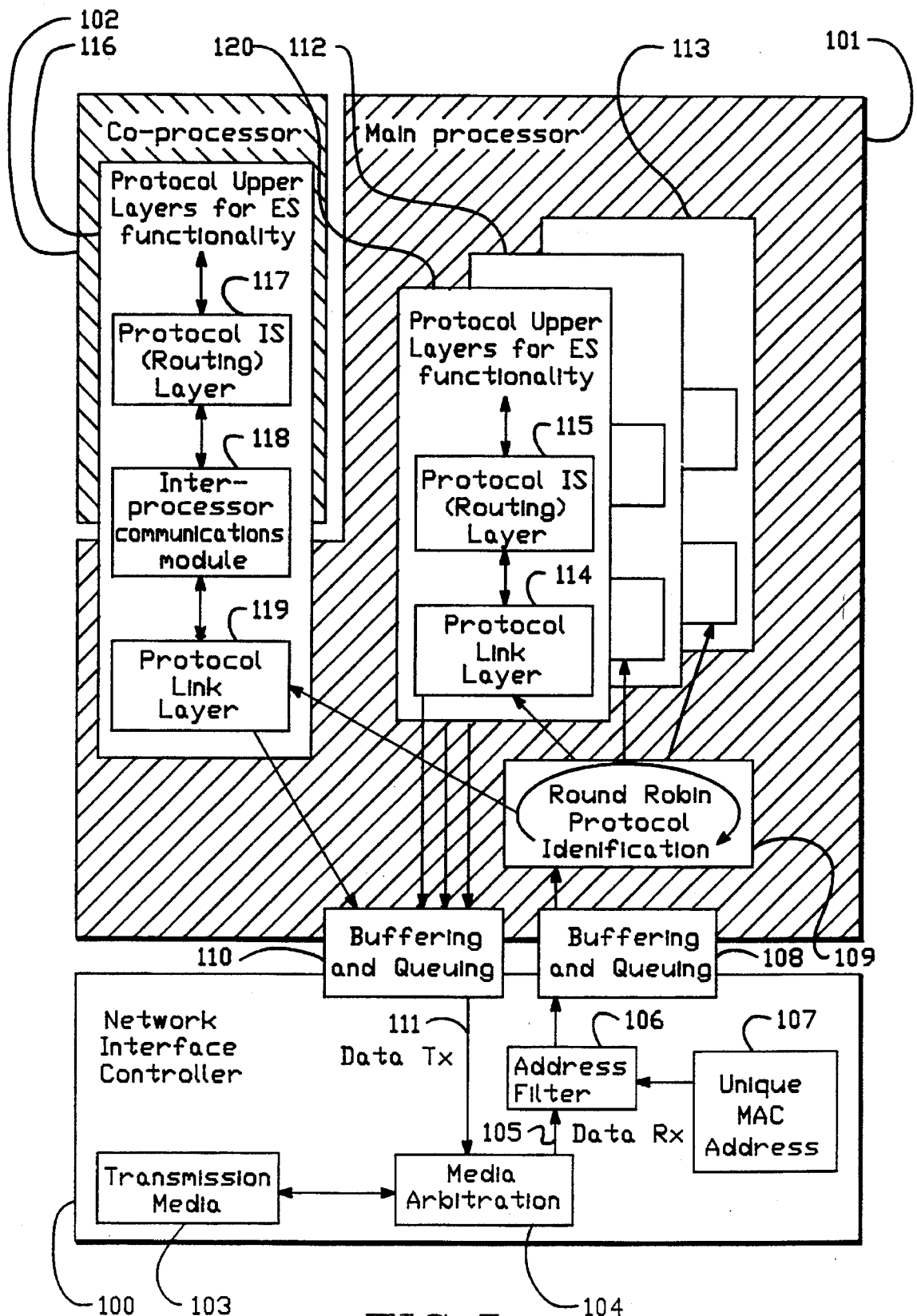
FIG. 5 is a functional block diagram of a prior art end system/intermediate system computer having a single MAC address.

A detailed description of the present invention is provided with respect to FIGS. 1–17, in which FIGS. 1, 2, and 5 represent prior art, and FIGS. 2, 4, and 6–17 illustrate the present invention.

I. Multiple MAC Addresses

According to the present invention, a set of MAC addresses is assigned to a Data Link Layer device instead of only a single MAC address, and logic is provided to block (discard) a packet or pass a packet to the upper layers on the computer based on whether or not the source and destination MAC addresses in the packet match the set of assigned addresses. A DLL device built with this invention incorporated is improved over traditional DLL devices by being able to make decisions at layer 2 where the time spent processing is minimal, versus at upper layers where the time spent is orders of magnitude more. Some examples of improvements that can be made using the invention include:

1) By assigning the computer's DLL multiple unique MAC addresses as if it consisted of multiple different computers, and building the DLL with multiple data channels to the upper layers, a single DLL can provide a virtual interface allowing various upper layer software to be written as if each software module had its own private DLL. This is discussed in more detail in the Virtual Data Link Devices section below.

2) By storing in the computer's DLL multiple additional MAC addresses which are multicast addresses, an ES computer can significantly reduce the processing in the upper layer software which must examine each multicast to determine whether it is relevant for it. Since most multicasts are discarded by ES computers, this use of the invention results in significant savings, especially on LANs with a large number of computers. Depending on the protocol, the DLL device can either accept all packets except those in its list of multicast MAC addresses, or accept only those in its list.

3) By storing in the computer's DLL multiple additional MAC addresses which were assigned to other computers on the LAN, an IS device which does bridging can have its processing overhead significantly reduced by having the DLL discard packets for which both the source and destination addresses in a packet are in the list of additional MAC addresses of the DLL. If the destination address is in the table, the packet does not have to be forwarded to another LAN. If the source address is in the table, the computer which sent the packet is "known" already to the bridge. If the source address is not in the table then the computer sending the packet is "unknown" to the bridge and its source address will be added to the list of addresses in the table by the upper layer software.

FIG. 1 shows a typical prior art design of an IS computer Brouter or Bridge which operates in promiscuous mode. The computer includes a network interface controller 10 which is coupled to a processor 11. The interface between the network interface controller 10 and the processor 11 includes a data path including transmit buffering and queuing structures 12, and receive buffering and queuing structures 13.

The network interface controller 10 is coupled to a transmission medium 14 through a media arbitration circuit 15. A path from transmit buffering and queuing structures 12 is provided across line 19 to the media arbitration circuit 15. Also, received data is supplied on line 16 to receive buffering and queuing structures 13. The unique MAC address 18 and address filter logic 17 typically exist on the network interface controller 10, but are not used when the device is operating in the promiscuous mode.

The buffering and queuing structures 12 and 13 are coupled to the link layer interface processing modules 20 in the processor 11. The link layer interface modules 20 are coupled with protocol layer modules 21 for the bridging and routing functions. These functions 21 are coupled to other local area networks or wide area networks as represented by block 22. Also, the protocol layer modules 21 may be coupled to a network management resource block 23 executed by the processor 11.

The software is layered in this design, with processing required to differentiate routed packets, bridged packets, and network management packets. Since bridging requires checking every packet, the software executed by processor 11 must in fact process all packets on the LAN.

FIG. 2 shows the software algorithm for the bridging section of the prior art device of FIG. 1. The algorithm shown in FIG. 2 begins with a receive packet block 30. After the upper layer software receives the packet from the buffering and queuing structures, the software first determines whether the packet has a local destination (block 31). This determination is made with reference to a MAC address data base 32 which has been developed by the software. If, in block 31, it is determined that the packet has a local destination, then the software discards the packet (block 33). If, however, the packet has a remote destination, then the software forwards the packet to the remote LAN (block 34). After blocks 33 or 34, as appropriate, the end of packet processing is reached (block 35). Thus, every packet must be examined and either forwarded or discarded based on the destination MAC address. The bridge "learns" the unique MAC addresses of devices on the local LAN by examining the source address field of every packet and creating a database of them. This database is then used by the bridge to filter packets which are local. Since every packet must be examined by the software, the processor of a bridge must have sufficient capacity or else packets may be missed or "dropped" and not forwarded when they should have. These dropped packets are usually recovered by upper layer protocol software on the end stations, but they cause performance and response problems, and can lead to "thrashing", when ES devices start sending more packets to recover the lost packets, overloading the bridge even more.

Figure 3:
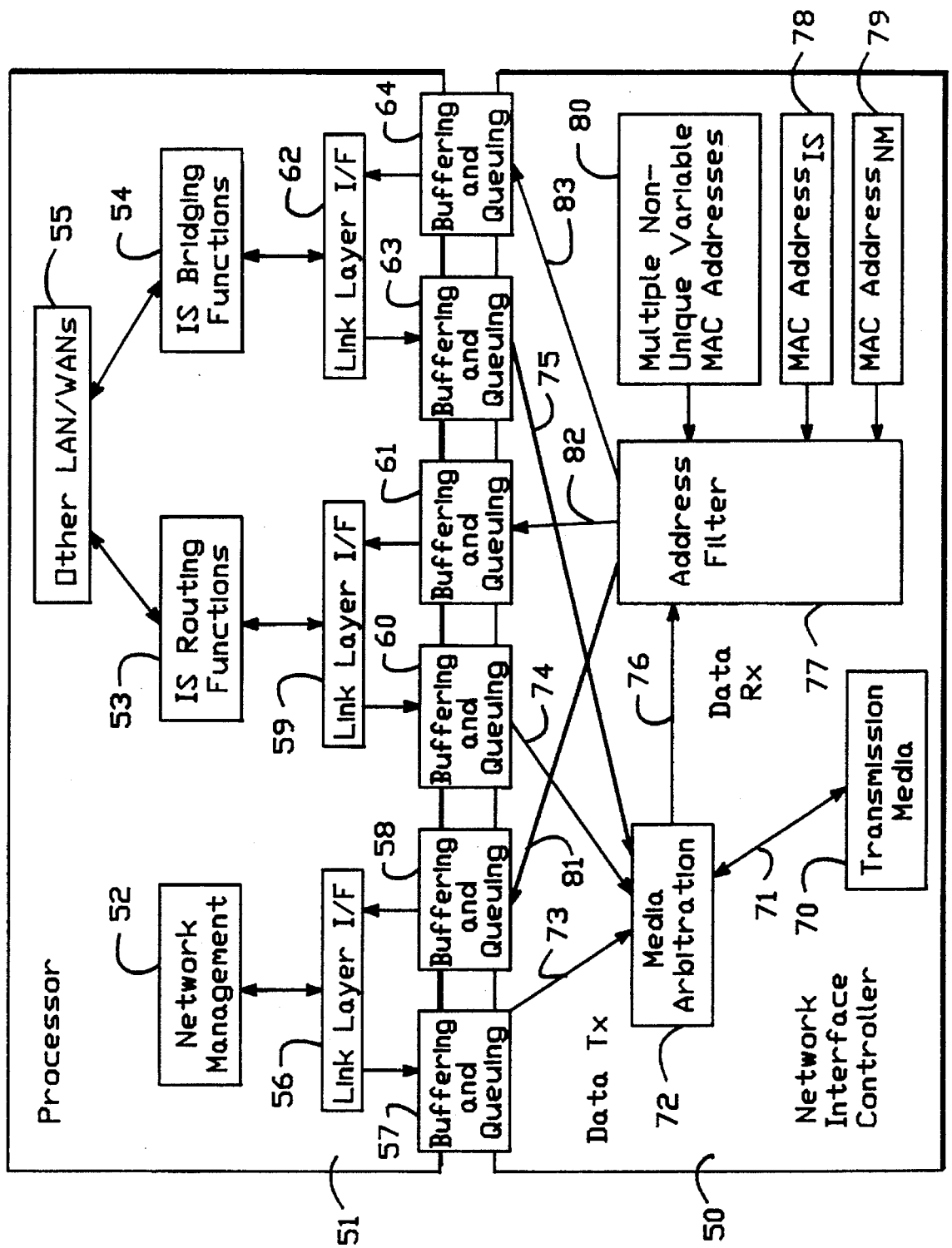
FIG. 3 is a functional block diagram of a network intermediate system implemented according to the present invention with multiple assigned MAC addresses.

Using the present invention, the performance of a Bridge or Brouter can be enhanced significantly. FIG. 3 shows a new design using the invention. The system includes a network interface controller 50 coupled to a host processor 51. The host processor 51 includes network management resources 52, intermediate system routing function resources 53, and intermediate system bridging function resources 54. The routing and bridging functions 53, 54 are coupled to other local area networks or wide area networks as represented by block 55. The network management resources 52 are coupled to a link layer interface module 56 for transmitting and receiving packets through buffering and queuing structures 57 and 58 to the network interface controller 50. Similarly, the intermediate system routing functions 53 are coupled to link layer interface resources 59, which are, in turn, coupled through buffering and queuing structures 60 and 61 for receiving and transmitting data through the network interface controller 50. Also, the intermediate system bridging functions 54 are coupled to a link layer interface module 62, which is, in turn, coupled through buffering and queuing structures 63 and 64 for receiving and transmitting data through the network interface controller 50.

The network interface controller 50 is coupled to a transmission medium 70 which receives and transmits data across line 71 to media arbitration circuit 72. The media arbitration circuit 72 merges the transmit data paths 73, 74 and 75 from the transmit buffering and queuing structures 57, 60, and 63 for the respective link layer interfaces 56, 59, and 62 in the host processor 51. Received data from the media arbitration circuit 72 is supplied across line 76 to address filter logic 77. The address filter logic is coupled to a memory which stores an assigned MAC address 78 for the intermediate system functions, and an assigned MAC address 79 for the network management functions, and multiple, non-unique, variable MAC addresses 80 used for additional filtering functions. Received packets are thus passed or blocked in response to the assigned addresses, 78, 79 and in response to the additional addresses 80. Thus, the address filter is coupled across line 81 to buffering and queuing structure 58 for network management destined packets. The address filter supplies data across lines 82 and 83 to the buffering and queuing structures 61 and 64 for the routing and bridging functions respectively.

By programming the DLL's address array 80 with addresses of local ES devices, and blocking packets based on their destination address matching an entry in this array, the number of packets that the bridge software must deal with is reduced significantly. By also using the array to compare source addresses in packets, the learning function of the bridge can also be greatly improved. In addition, by using several unique MAC addresses, the network management, IS routing functions, and bridging functions of the device can be separated as well.

FIG. 4 shows the new bridging software logic taking advantage of the invention. The new algorithm shown in FIG. 4 includes a receive packet block 90. The first step for a received packet is to determine whether the packet is local (block 91). This step is carried out in response to a MAC address database 92 generated by the bridging software logic. If the packet is local, then the algorithm branches to block 93 where the packet is discarded. After the packet is discarded, the address array 80 in the network interface controller is updated (block 94). If at block 91 it was determined that the packet was destined to a remote network, then it is forwarded to the remote LAN (block 95). After blocks 94 or 95, as appropriate, the packet processing has been completed by the bridge software (block 96). Although there is an extra step (block 94) in the logic, the vastly fewer number of packets that must be processed using the invention nets a significant reduction in processor bandwidth required. In addition, the update step may be configured to happen during "deadtime" when no other CPU activity is likely to occur.

By storing source/destination address pairs in the DLL, a problem in the usage of multicast packets by many protocols suites can be overcome. For these protocols, a single multicast address is used for all group messages, and the particular upper layer usage (such as name resolution) is configured in the data portion of the packet which is not accessible by the DLL. This makes blocking of specific multicasts impossible. However, by having a list of address pairs, a DLL can be configured to block all multicast packets from all computers except the ones it cares about.

II. Virtual Data Link Devices

Because computers today are built with a single DLL and are assigned a single MAC address, the upper layers (3–7) of the computer must be more complicated when plural functions access the network. According to the invention multiple virtual DLL's are provided, each with their own unique MAC address assigned and optionally each with their own data path to the DLL. This allows a computer to be much simpler by having each major upper layer module have exclusive access to its own virtual DLL. An example of the improvement of a computer based on this is as follows.

In an integrated IS/ES device with several protocols, a unique MAC address for each protocol module and for the IS module allows a packet to be passed directly to the correct software module instead of the costly (in terms of CPU bandwidth and time spent) RRPI method mentioned in the Description of Related Art above. This technique is also very valuable in multi-processor systems, allowing upper layer software modules to execute on different CPUs and have their packets transferred to them at the physical layer instead of at an upper layer of software which is again expensive in terms of CPU bandwidth and time spent.

FIG. 5 below shows a prior art system architecture of an integrated IS/ES multiprocessor device, illustrating the data flow and software modules.

The integrated IS/ES device in the prior art includes a network interface controller 100 coupled to a main processor 101. The main processor is in turn coupled to a co-processor 102.

The network interface controller 100 is coupled to a transmission medium 103 through media arbitration circuit 104. Media arbitration circuit 104 passes received data across line 105 to an address filter 106 which stores a unique MAC address 107. Packets which pass the filter 106 are supplied through buffering and queuing structures 108 to round robin protocol identification module 109.

Packets to be transmitted from the main processor 101 or co-processor 102 are passed through buffering and queuing structures 110 across path 111 to the media arbitration circuit 104.

In the embodiment shown in FIG. 5, the main processor 101 executes a plurality of processing modules 111, 112, 113 which execute independent upper layer protocols. Each includes a protocol link layer interface 114, which is coupled to a protocol intermediate system layer for routing functions or the like 115, and on to the protocol upper layers for end system functionality.

Similarly, the co-processor 102 executes a processing module 116. Processing module 116 includes the protocol upper layers for end system functionality which are coupled to a protocol intermediate system layer 117. The protocol intermediate system layer 117 is coupled to interprocessor communication module 118. This module communicates with a protocol link layer interface module 119 executed by the main processor 101.

Thus, the round robin protocol identification module 109 routes received packets to the respective protocol link layer interfaces (e.g., 119, 114) of the processing modules 116, 111, 112, 113. Packets transmitted by the respective processing modules (116, 111, 112, 113) are passed through the buffering and queuing structure 110 directly to be transmitted through the media arbitration circuit 104.

Figure 6:
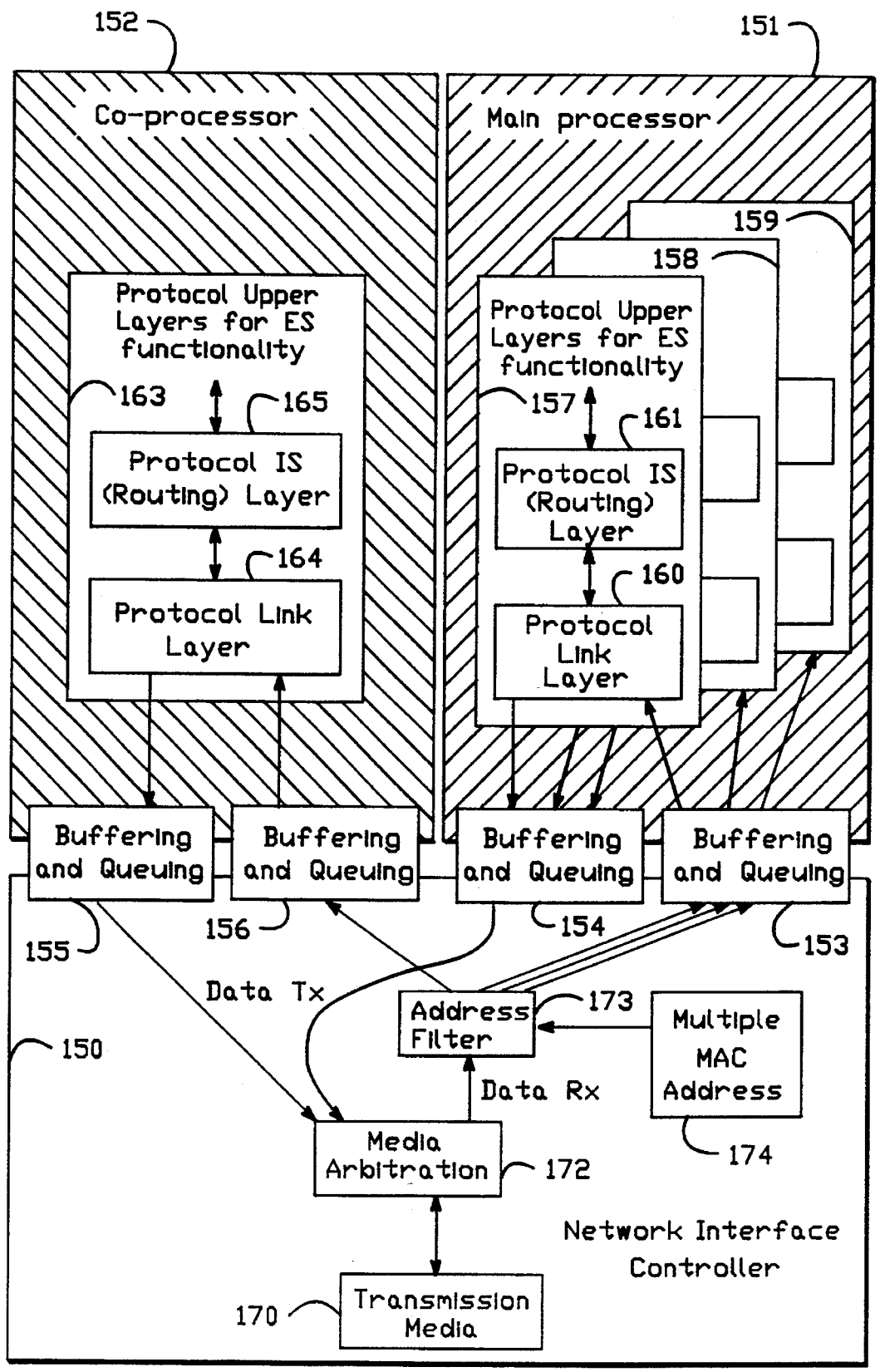
FIG. 6 is a functional block diagram of an end system/intermediate system having multiple MAC addresses according to the present invention.

A co-processor/main processor system modified according to the present invention is illustrated in FIG. 6. As shown in FIG. 6, the integrated IS/ES system according to the present invention includes network interface controller 150 which is coupled to a main processor 151 and a co-processor 152. Main processor 151 is coupled to the network interface controller 150 through buffering and queuing structures 153 and 154. The co-processor 152 is coupled to the network interface controller 150 through buffering and queuing structures 155 and 156.

The main processor executes a plurality of processing modules 157, 158, 159 which include a protocol link layer interface 160, coupled to protocol intermediate system layer 161, which is in turn coupled to the protocol upper layers for end system functionality for the respective modules. Each of the modules 157, 158, 159 is coupled directly to the transmit buffering and queuing structure 154 and directly to the receive buffering and queuing structure 153 to establish a data channel to the network interface controller.

The co-processor 152 also executes a processing module 163. This processing module includes protocol link layer module 164, protocol intermediate system layer 165, and protocol upper layers for end system functionality as before. However, by incorporating the protocol link layer interface 164 in the co-processor, and connecting the protocol link layer directly to the buffering and queuing structure 155 for transmitted frames and the buffering and queuing structure 156 for received frames, an independent data channel is established for the co-processor through a separate data path, without reliance on an interprocessor communication module.

The network interface controller 150 of FIG. 6 is coupled to a transmission medium 170 through media arbitration circuit 172. Received data is coupled through address filter 173 which stores multiple MAC addresses as described above in memory 174. Three data channels are coupled through a path that comprises the buffering and queuing structure 153 to the respective modules 157, 158, 159 of the main processor. A separate data channel is coupled through buffering and queuing structure 156 from the address filter 173 to the module 163 executed by the co-processor. Transmitted frames are supplied from the three modules of them in processor 151 through the buffering and queuing structure 154 to the media arbitration circuit 172. Also, transmitted frames are supplied from the co-processor module 163 through the buffering and queuing structure 155 to the media arbitration circuit 172.

As can be seen, the upper layer system is much simplified for the integrated IS/ES system, and the upper layer interprocessor communications and round robin protocol identification modules are no longer required.

Figure 7:
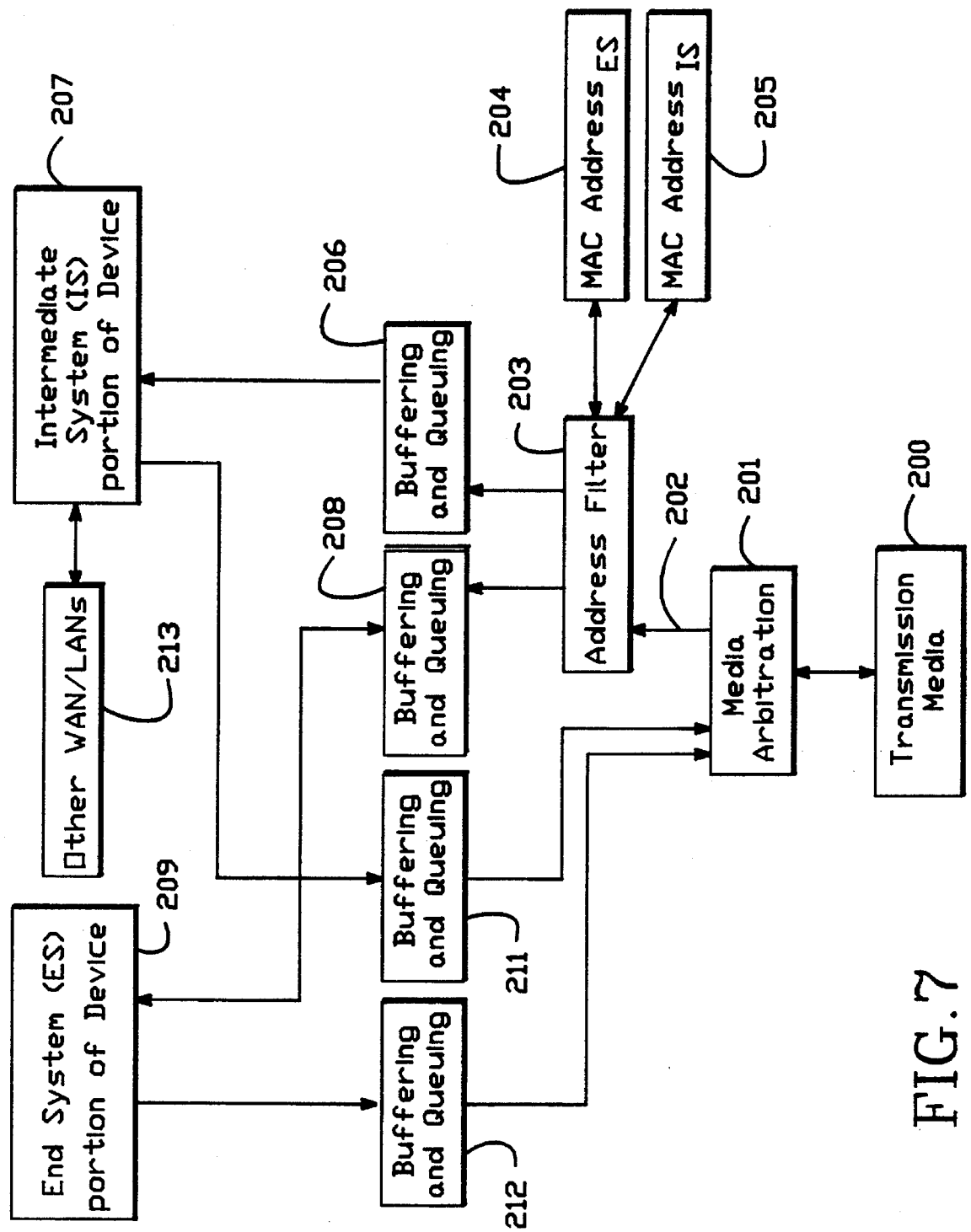
FIG. 7 is a functional block diagram of a simplified IS/ES computer according to the present invention.

FIG. 7 illustrates another application of the present invention, in which the integrated computer separates the end system and intermediate system functions in hardware, providing each function its own processor. Thus, as can be seen in FIG. 7, the system is coupled to a transmission medium 200 through media arbitration circuit 201. Received frames are supplied across line 202 to an address filter 203. The address filter 203 is responsive to a first assigned MAC address 204 for the end system processor and a second assigned MAC address 205 for the intermediate system processor. Received frames destined for the intermediate system are coupled from buffering and queuing structure 206 to intermediate system processor 207. Received packets destined through the end system are coupled to buffering and queuing structure 208 to the end system processor 209. Similarly, frames transmitted from the intermediate system are coupled through buffering and queuing structure 211 to the media arbitration circuit 201. Packets transmitted by the end system portion of the device 209 are coupled to buffering and queuing structure 212 to the media arbitration circuit 201.

The intermediate system 207 is coupled through at least one other network interface to other networks such as a wide area network or local area network medium as represented by block 213.

The design of prior art integrated IS/ES systems is such that the system shares hardware and a single unique MAC address for each LAN it is attached to, and the upper layer software must determine, based on the data portions of the packet, whether the packet is for the local ES portion of the system, for the IS portion, or for both. The present invention provides a hardware MAC solution which allows for two or more unique MAC addresses, and hardware level routing of packets based on the MAC destination address, with one path (208) getting only broadcast packets and packets with one unique address dedicated to the ES portion of the system, and the other path (206) getting either all packets (in the case of IS bridging functionality) or broadcast and directed packets to a unique MAC address dedicated to IS routing functionality in the system. The IS portion is ideally a co-processor allowing CPU separation of the IS and ES functionality. This new method of integrating ES and IS functionality is particularly attractive for Routing Adapters in a Boundary Routing environment as described in co-pending U.S. patent application by John Hart, Ser. No. 07/871,113, Filed Apr. 20, 1992, entitled SYSTEM FOR EXTENDING NETWORK RESOURCES TO REMOTE NETWORKS. In the routing adaptor, the CPU and RAM requirements in terms of size, complexity and performance for the co-processor dedicated to the IS functionality are minimal and can be integrated with the new MAC hardware onto a single PC card.

Figure 8:
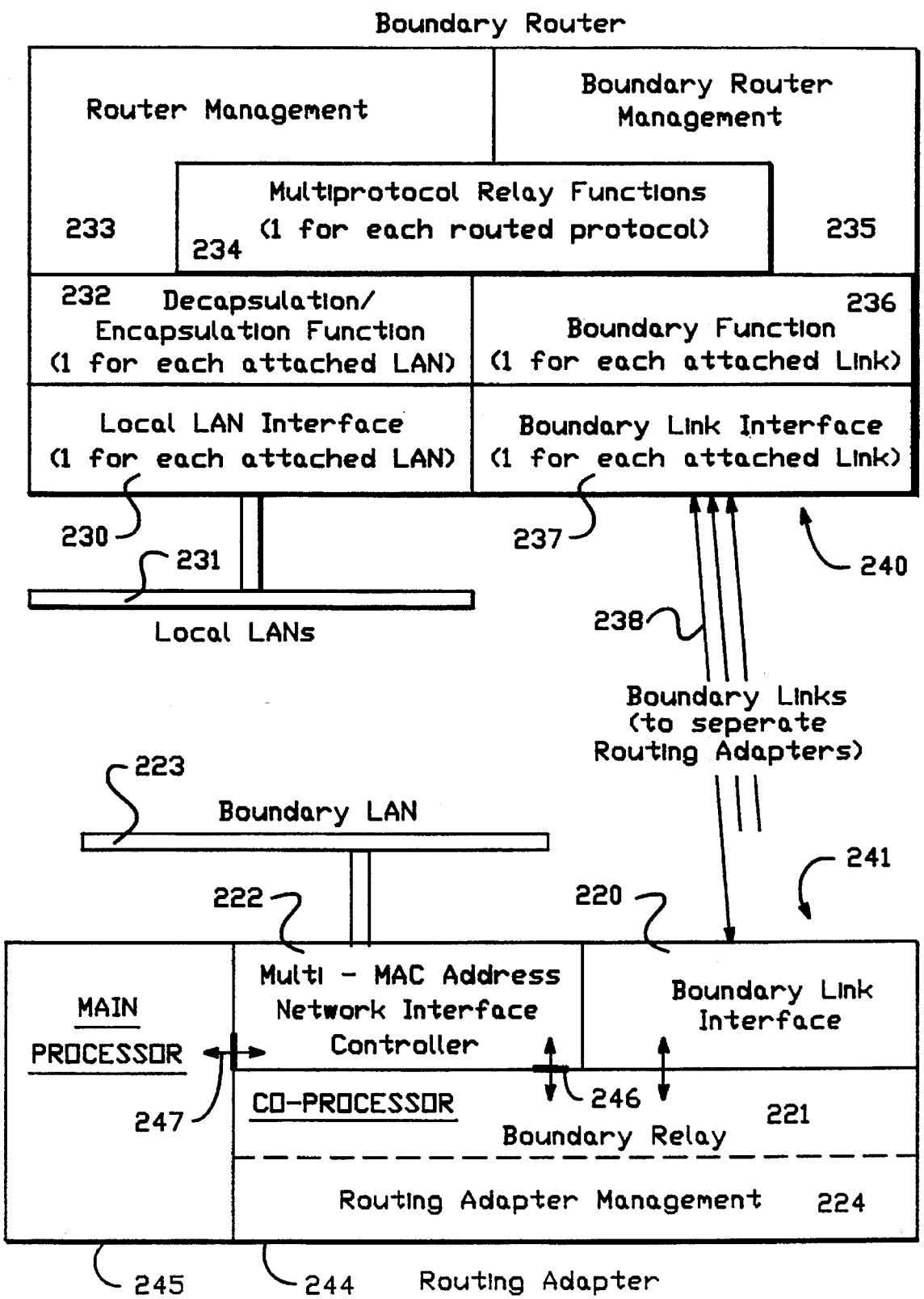
FIG. 8 is a functional block diagram of a routing adaptor/boundary router system utilizing the present invention.

As illustrated in FIG. 8, a routing adapter 241 executes functions independent of the protocol suites encapsulated in LAN frames received/transmitted across boundary LAN 223 and link 238 to which it is attached. The routing adapter functionality consists of boundary link interface 220 coupled to a co-processor 244 which executes boundary relay functions 221, and routing adapter management functions 224. In addition, a multiple MAC address network interface controller 222 such as described above, is coupled across a first interface 246 having a unique MAC address to the co-processor 244 and across a second interface 247 having a unique MAC address to the main processor 245.

The boundary link interface function 220 is positioned between a boundary link 238 and boundary relay function 221. The boundary link interface 220 in the routing adapter 241 works with its peer boundary link interface function 237 in the boundary router 240 and is responsible for transmitting and receiving frames to and from the boundary link 238. The functionality of the boundary link interface 220 is essentially identical to the boundary link interface 237 in the boundary router 240.

A boundary router, as shown in FIG. 8, includes at least one local LAN interface 230 for attachment to a local LAN 231. There is one local LAN interface for each attached LAN, as indicated in the figure. Each local LAN interface will be given a LAN address for use by the routing resources on the boundary router. Coupled to the local LAN interface is a decapsulation/encapsulation function 232, also one for each attached LAN. The decapsulation/encapsulation function 232 is coupled to router management 233 and multi-protocol relay 234 functions which are implemented for each routed protocol. Extensions to the boundary router to serve the remote network include boundary router management 235, a boundary function 236, and a boundary link interface 237. The boundary link interface 237 is connected to a boundary link 238 which provides communication with a boundary link interface 220 on the routing adapter 241.

Thus, a boundary router contains all the logic of a multiprotocol router (such as NETBuilder, available through 3COM Corporation, Santa Clara, Calif.) plus boundary functionality for the boundary links that interconnect the boundary router to the routing adapter. The additional functionality consists of boundary router management 235, boundary function 236, and the interface to the boundary link interface 237.

In the routing adaptor, the multiple MAC address network interface controller 222 includes a first interface 246 positioned between the boundary LAN 223 and boundary relay 221 on the co-processor. The interface 246 of the interface controller 222 is responsible for transmitting and receiving frames to and from the boundary LAN 223 for the routing adaptor. The functionality of the network interface controller 222 for interface 246 includes the following:

1. handling the physical and data link protocols, etc., as defined by the boundary LAN 223;
2. transmitting frames relayed by boundary relay function 221; and
3. passing valid received LAN data frames to the boundary relay function 221 which have a destination address within a programmed set of addresses including the address of the interface 246 which provides an extended remote interface to the boundary router, or group address(es) set by routing adapter management function.

The boundary relay function 221 includes the adaptor's frame relay logic and operates independent of higher level protocol suites. The frame relay logic of a routing adapter 201 is defined by the following two rules.

1. Any frame passed from the boundary LAN 223 to the boundary relay 221 is forwarded to its boundary link interface 220 unless link 238 is not operational. In this case, it may be network management frame and it is passed to the routing adapter management function 224. This allows the routing adapter to be managed locally when the link is not operational. For instance, the routing adapter management 224 may respond to management frames which request an attempt to re-open a link, such as by attempting re-dials on dial links.
2. Any frame received from its boundary link interface 220 is forwarded to the network interface controller 222 through interface 246 unless its destination equals the routing adapter's LAN address. In this case, it is a network management frame from the boundary router management function 235 and it is passed to the routing adapter management function 224.

Routing adapter management 224 maintains local configuration information such as the LAN type of the boundary LAN 223 and the multicast destination addresses to be received.

Also, the routing adapter management 224 operates as the agent of the boundary router management function. As such, it is responsible for processing and responding to management requests, responses, etc., received from it.

Further, the routing adapter management 224 is responsible for processing and responding to management requests, responses, etc., received from end systems on the boundary LAN 223 when the boundary link 238 is not operational.

The network interface controller 222 also provides an interface 247 having a unique MAC address to the boundary LAN for the main processor 245, which executes such end system functions as suits a particular system unencumbered by the processes required to identify frames needed by the routing adaptor functions of the co-processor 244.

Figure 9:
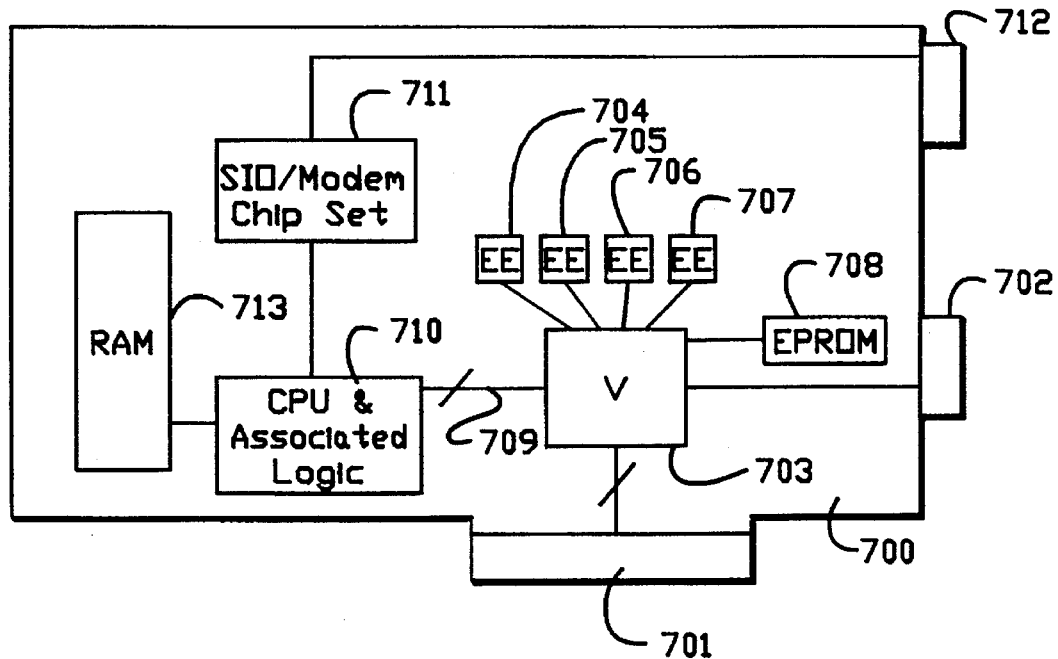
FIG. 9 is a schematic diagram of a co-processor with a network interface controller according to the present invention, adapted for connection with a host processor.

FIG. 9 illustrates a printed circuit board incorporating a network interface controller according to the present invention. The circuit board 700 includes a host bus connector 701, a transmission medium connector 702, and an integrated circuit transceiver 703 adapted to receive and transmit communications through the connector 702. Coupled with the transceiver 703 are a plurality of non-volatile memory cells, such as EEPROMs 704, 705, 706, and 707 storing respective MAC addresses for use by address filtering logic in the integrated circuit 703. Also, a program store 708 for optional remote initial program load (RIPL) of the operating system of the computer system the board is inserted into. The chip 703 communicates across line 709 in a plurality of channels to CPU and associated logic 710 on the board. This logic 710 is coupled through an SIO/modem chip set 711 to a telecommunications link 712. Also, memory 713 is coupled to the CPU and associated logic 710. This configuration is particularly suited to the routing adapter embodiment where the CPU serves as the co-processor of FIG. 8.

Figure 10:
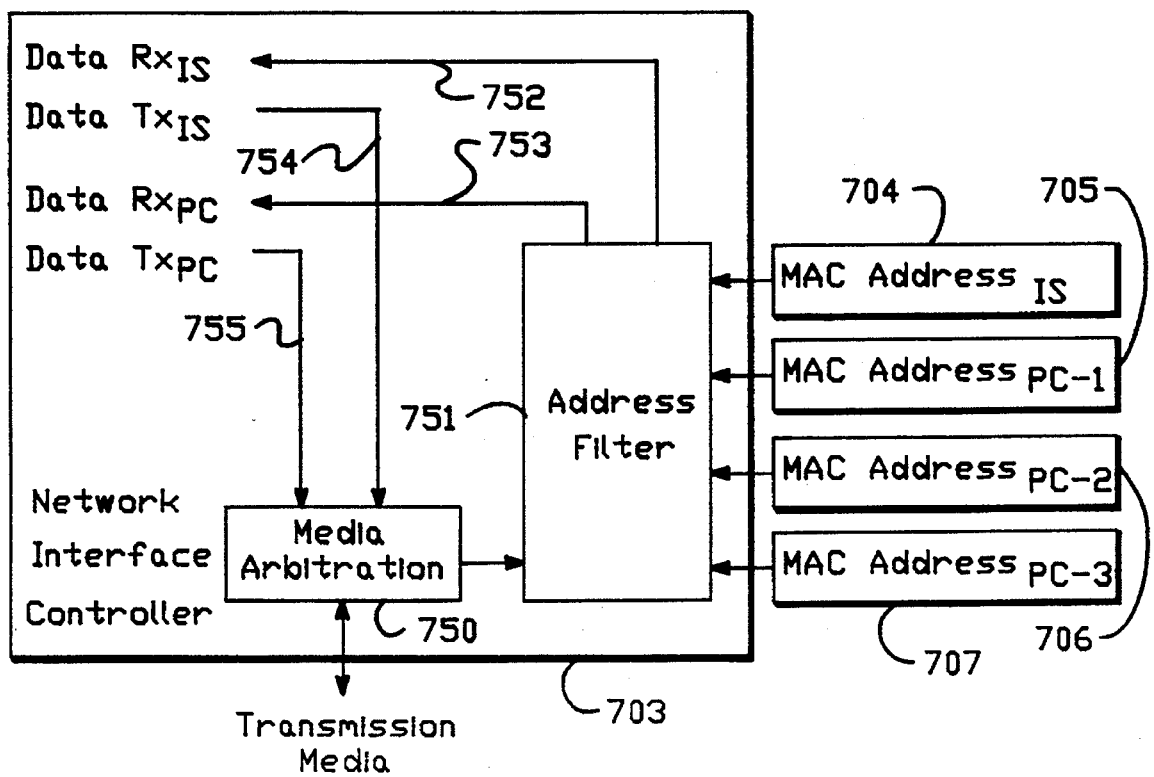
FIG. 10 is a schematic diagram of the network interface controller for use with the system of FIG. 8.

FIG. 10 illustrates the network interface controller 703 used in the system of FIG. 9. This device 703 includes the media arbitration circuit 750 and address filtering logic 701 which is coupled to the MAC address registers 704 through 707. The address filter 751 supplies the received data to intermediate system modules in the CPU and associated logic 701 across line 752 and receive data to the PC processing modules across path 753. Transmit data is received from the intermediate system on line 754 and from the PC system along line 755.

As illustrated in FIG. 10, there are three MAC addresses assigned to PC processing modules. These MAC addresses are presented across line 753 as virtual data link layer devices which share a physical data path to the PC. However, this data path is divided into independent channels for communicating with data link layer processes from the point of view of the PC software.

III. Media Arbitration

Because wiring distribution systems today such as Ethernet's 10BaseT were not designed to handle devices with multiple MAC addresses and multiple data paths, the present invention provides a new medium arbitration interface scheme which functions correctly with standard wiring systems.

DLLs today do not receive the same packet that they are transmitting on the media. With a single DLL this is not an issue because the upper layers of the computer know when they send a packet. However, with virtual DLLs, when one module sends a packet, other modules might be the recipients of that packet. The invention provides the ability to receive packets that are being transmitted through virtual DLLs as if they came from a different computer.

Figure 11:
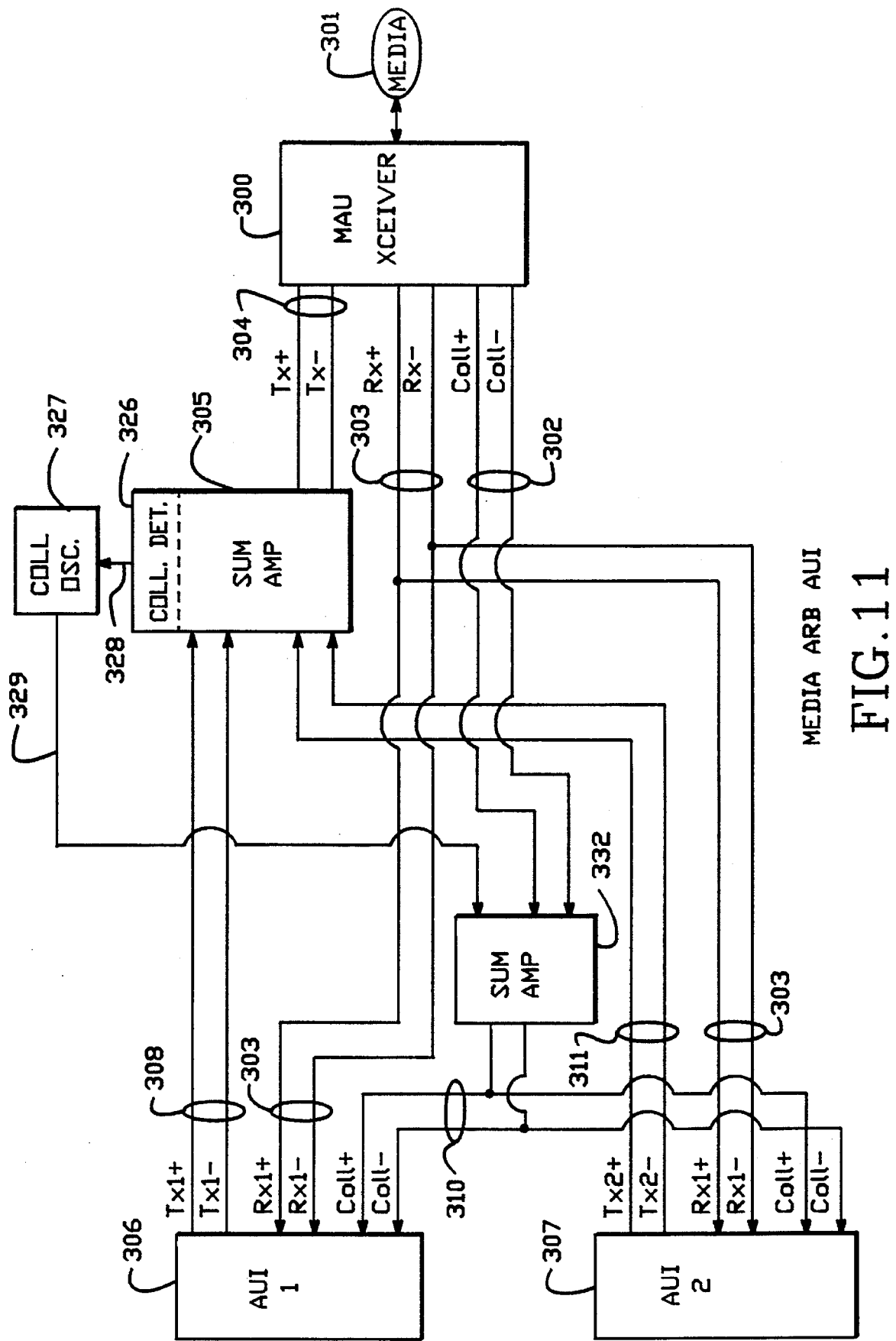
FIG. 11 is a functional block diagram of media arbitration circuitry for an AUI interface according to the present invention.
Figure 12:
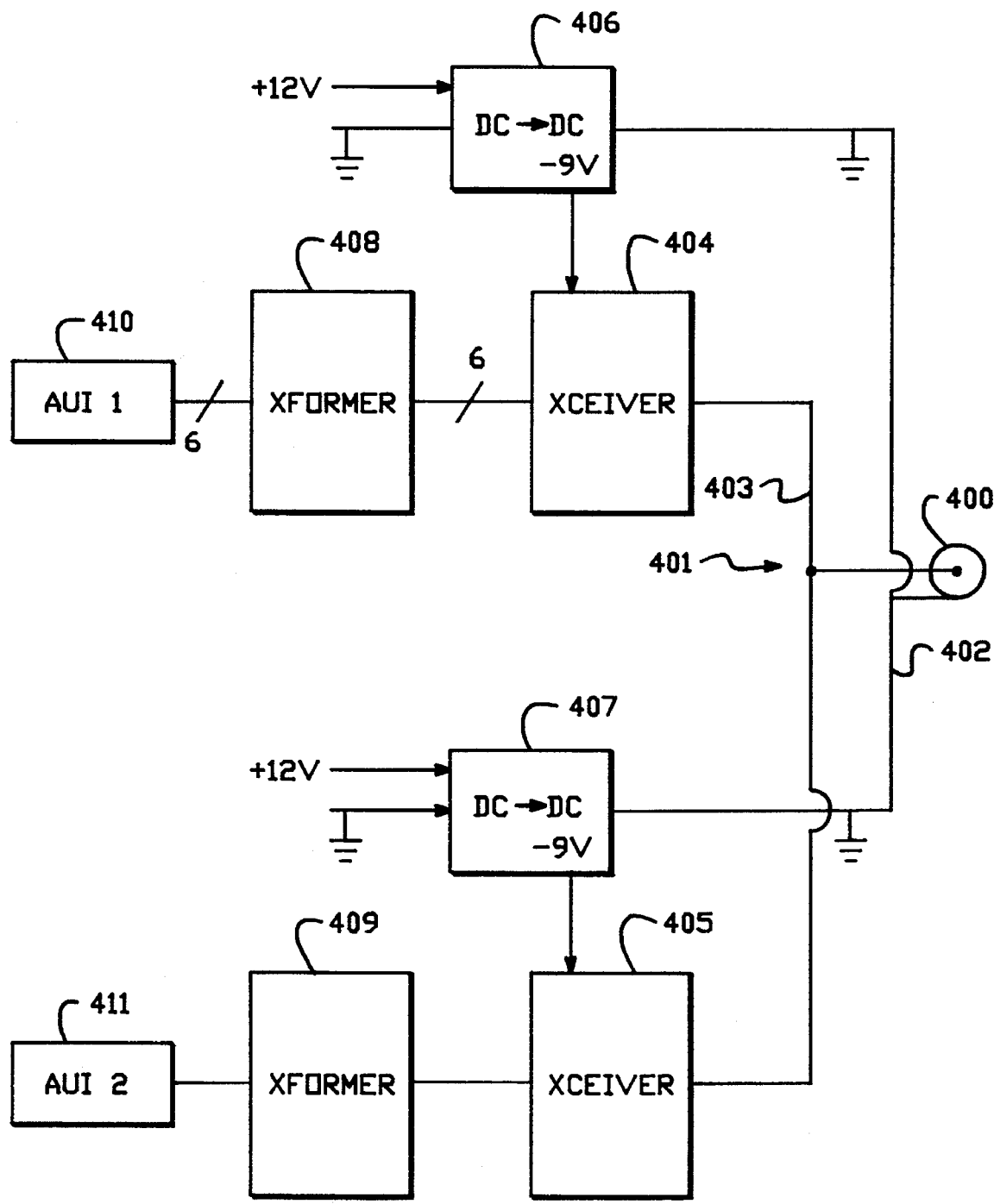
FIG. 12 is a functional block diagram of media arbitration circuitry for a BNC connector.
Figure 13:
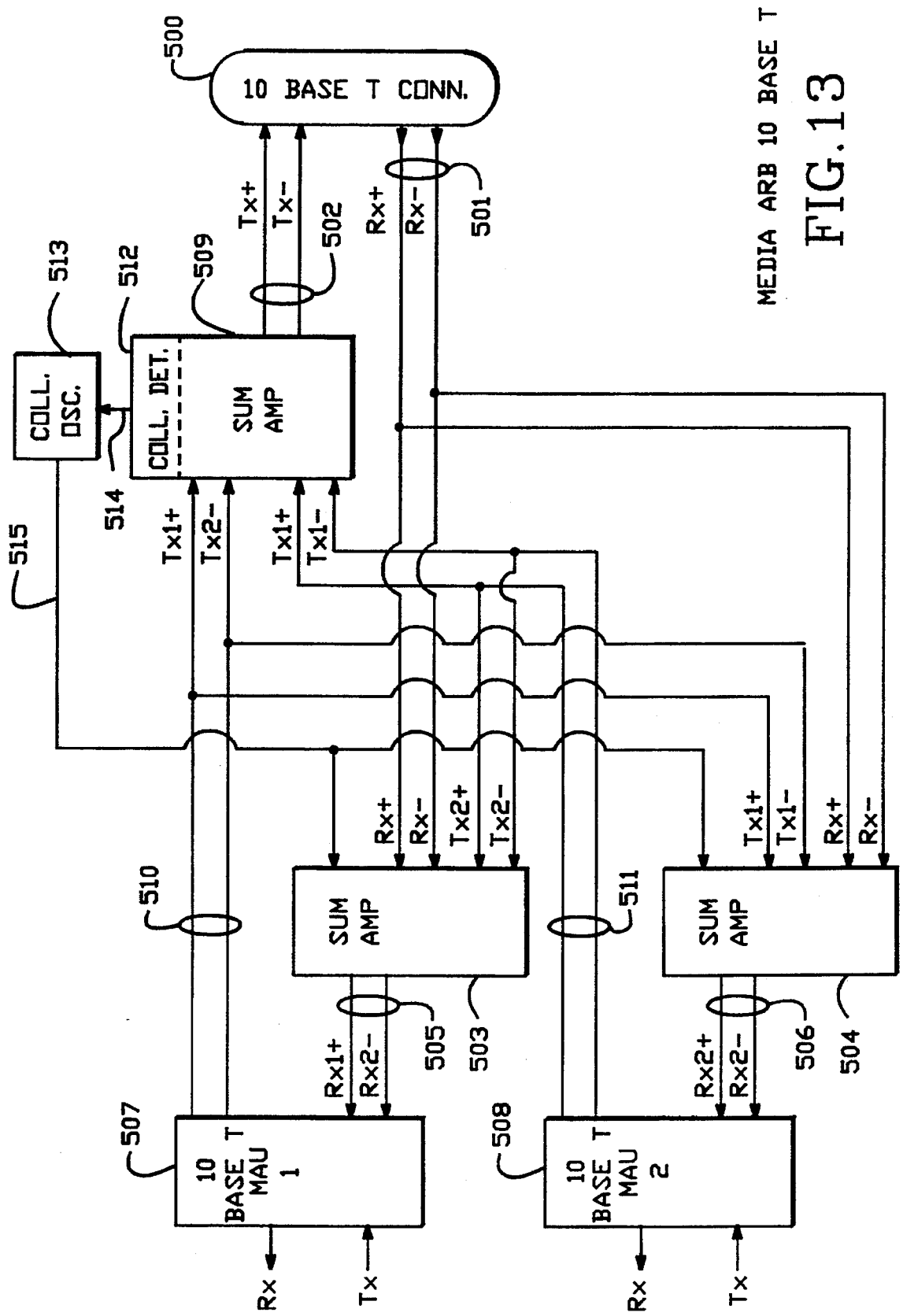
FIG. 13 is a functional block diagram of media arbitration circuitry for a 10BaseT connector.

FIGS. 11, 12 and 13 illustrate three alternative media arbitration circuits according to the present invention for Ethernet type interfaces. This technology may be applied as well to other network types, such as token rings, token buses, FDDI, ISDN, etc., with appropriate modifications to serve the multiple virtual DLLs to which the arbitration circuits are connected.

FIG. 11 illustrates a media arbitration circuit which merges the data paths at the attachment unit interface AUI. The system includes a medium attachment unit transceiver 300 coupled to a medium 301 of the network. The medium attachment transceiver 300 is any one of a number of commercially available integrated circuits which provide the medium attachment unit MAU services to a particular medium 301, and generates the signals to drive a standard attachment unit interface AUI. Thus, the output signals of the transceiver 300 include a plus and minus collision pair 302, a plus and minus receive pair 303, and a plus and minus transmit pair 304.

Each of the virtual DLLs served by the media arbitration circuit presents a standard AUI interface to the media arbitration circuit. Thus, the system includes AUI 1 306, and AUI 2 307. AUI 1 306 includes transmit pair 308, receive pair 303, and collision pair 310. AUI 2 includes transmit pair 311 and receive pair 303. AUI 2 shares the collision pair 310 with AUI 1.

The transmit pairs 308 and 311 are merged in summing amplifier 305 to generate transmit pair 304 for the transceiver 300. Coupled with the summing amp is collision detection logic 326. The collision detection logic 326 is coupled to a collision oscillator 327. The collision detect logic 326 signals the oscillator 327 across line 328 when a collision is detected. The output of the collision oscillator 327 is supplied on line 329 (comprising a plus and minus pair as known in the art), beginning when both the transmit pairs 308 and 311 are transmitting through the summing amp 305, and ceasing when both cease transmitting.

The receive pair 303 delivers the receive signal to interfaces AUI 1 306 and AUI 2 307. The MAU transceiver 300 echoes data sent on transmit pair 304 via receive pair 303, thus providing a receive path for both receivers to receive transmissions sent by the other.

The collision pair 310 at AUI 1 and AUI 2 is generated at the output of summing amp 332. The inputs to the summing amp 332 include the output of oscillator 327 on line 329 and the collision pair 302 generated by the transceiver 300.

Thus, it can be seen that packets transmitted through AUI 1 are received by AUI 2 and vice versa. Also, collisions between transmit pairs 308 and 311 are detected in the media arbitration circuit. Finally, the summing amplifiers isolate the transceiver outputs 300 from the separate virtual DLL interfaces 306 and 307.

FIG. 12 illustrates an embodiment of media arbitration circuit adapted for connection to a BNC type Ethernet. In this system, a coaxial cable 400 meeting the BNC Ethernet standards is tapped with a connector generally 401. The connector 401 supplies ground line 402 and signal line 403. The signal line 403 is coupled to a first transceiver 404 and a second transceiver 405. Ground line 402 is coupled to the DC to DC converters 406 and 407 which are coupled respectively to transceivers 404 and 405. The DC to DC converters 406 and 407 supply −9 Volt power to the transceivers 404 and 405 as known in the art. The transceivers 404 and 405 generate the 6 outputs of an AUI interface, which are supplied through transformers 408 and 409, respectively to the separate AUI interfaces, AUI 1 410, and AUI 2 411, for the separate virtual DLLs according to the present invention.

FIG. 13 illustrates the media arbitration circuitry for a 10BaseT standard Ethernet connector using twisted pair transmission media. Thus, a 10BaseT connector 500 supplies a receive pair 501 and receives a transmit pair 502. The receive pair 501 is supplied to a first summing amp 503 and a second summing amp 504 which drive respective receive pairs 505 and 506 for medium attachment unit transceivers 507 and 508, respectively. The transceivers 507 and 508 are coupled to the data paths in the network interface controller as known in the art, may or may not provide the standard AUI type interface.

The transmit pair 502 of the system is driven by summing amp 509. The inputs to the summing amp 509 include the transmit pair 510 generated by MAU 1 507 and the transmit pair 511 generated by MAU 2 508. The summing amp includes collision detection logic 512 which is coupled to a collision oscillator 513. When both transmit pairs 510 and 511 begin transmitting, the collision oscillator is signalled across line 514 and begins generating a collision signal on line 515. When both transmit pairs 510 and 511 cease transmitting, the collision signal on line 515 is turned off.

The inputs to the summing amps 503 and 504 which drive the receive pairs 505 and 506, respectively, receive the collision signal on line 515.

In addition, summing amp 503 which drives the receive pair 505 for MAU 1 507, receives the transmit pair 511 from MAU 2 as input. Summing amp 504 which drives the receive pair 506 receives in addition to the receive pair 501 and the collision pair 515, and the transmit pair 510 supplied by the MAU 1 507.

Thus, it can be seen that the circuit of FIG. 13 provides the ability to receive packets transmitted by neighbor virtual DLLs, isolates the connector 500 from the separate virtual DLLs, and presents a standard interface to the address filter and transmit buffering and queuing structures.

IV. General Purpose Programmable Ethernet NIC

An Ethernet Network Interface Controller NIC based on the invention is described with reference to FIG. 14 and Tables 1, 2, 3, and 4 set out in an appendix. The NIC has a table which can hold up to 511 MAC addresses, and provides two virtual DLL interfaces to the upper layers of the computer. It has a 511×511 address pair index array, allowing any packet with a particular pair of source and destination addresses in the address table to be specifically blocked or passed for each of the two virtual DLLs. The address pair table is implemented using an inexpensive 256K×4 external (to the NIC) RAM. The NIC provides two separate 32 bit full duplex data paths to external devices in the computer and has a common shared programming interface. The device has a number of registers for each of the two DLL interfaces (A and B) which control such actions as how a multicast should be treated, or what to do if the entry for a source destination implies the packet should be blocked, and the entry for a destination implies it should be passed.

Figure 14:
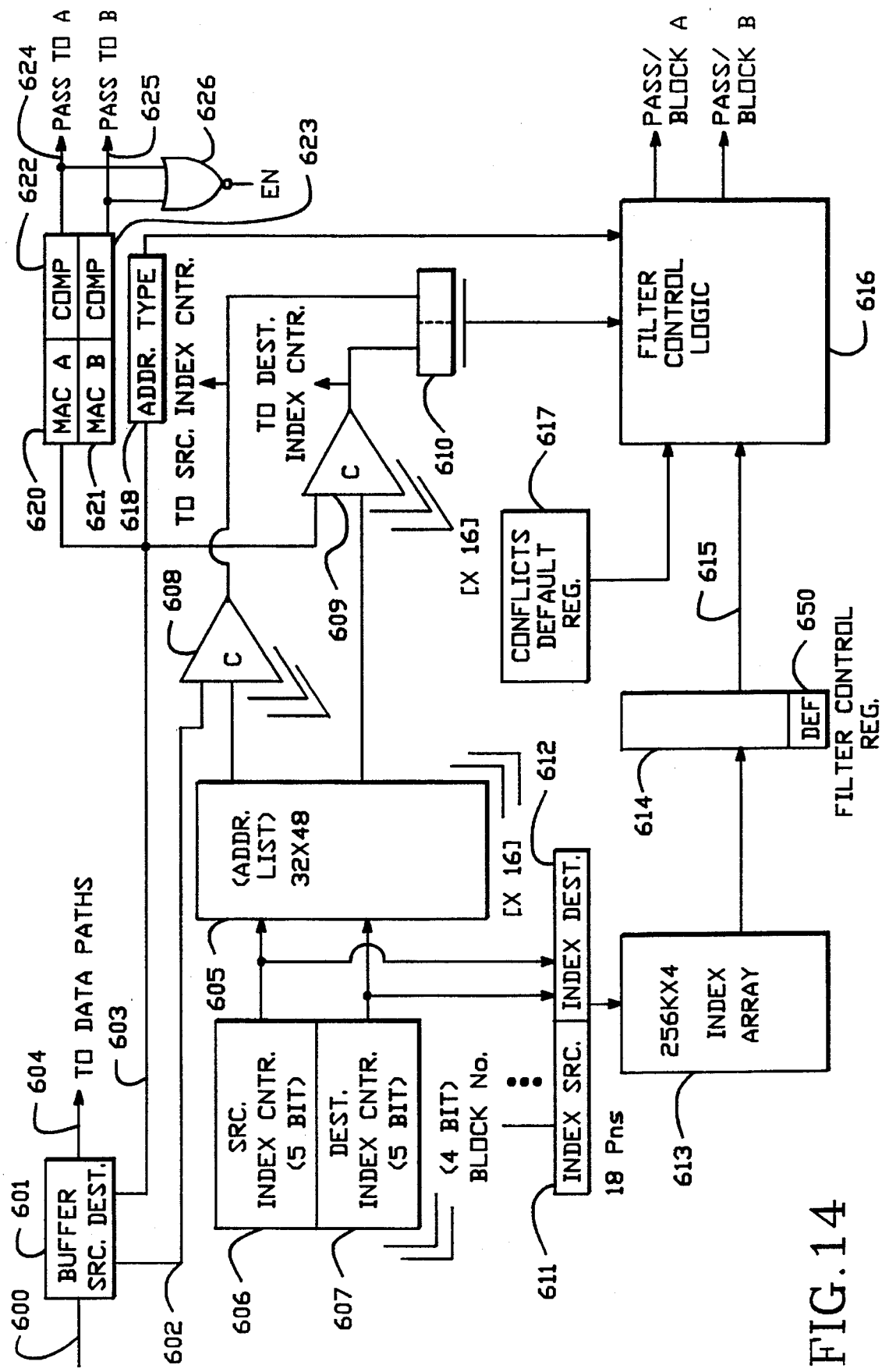
FIG. 14 is a functional block diagram of an address filter implemented according to the present invention.

FIG. 14 illustrates control structures in the device. Table 1 shows the algorithms described below for determining if a packet should be passed or blocked. The registers of the device are listed in Table 2, Table 3, and Table 4.

A portion of the NIC is schematically shown in FIG. 14 to illustrate the control structures. Incoming data is received on line 600 and supplied through a buffer 601. In the buffer 601, the source address is detected and supplied on line 602, and the destination address is detected and supplied on line 603. The data is supplied out of the buffer 601 to the data paths in the NIC on line 604.

The address filter includes an address list, generally 605, designed to hold a plurality of MAC addresses in addition to the assigned MAC addresses for the two data paths. The address list in the preferred embodiment includes a set of 16 32×48 bit RAMs for a total of 512 entries. Coupled with each in RAM 605 is a source index counter 606 and a destination index counter 607. The 16 RAMs 605 and counters 606, 607 are driven in parallel. A single module of the address list in address list counter logic is illustrated in the figure for simplicity. The output of each address list RAM 605 is supplied to a comparator 608 which receives as a second input the source address on line 602, and a comparator 609 which receives as a second input the destination address on line 603. The outputs of the comparators 608 and 609 are fed back as indicated for use in controlling the searching logic. Also, these outputs are supplied to an address match register 610 which stores two bit results of the matching process.

When a match is found, the value of the source index counter for a matching source is stored in the index source register 611, and the value of the destination index counter 607 is stored in index destination register 612. The five bit counter values for the 32 bit blocks are appended on a four bit block number, establishing 9 bit source index and a 9 bit destination index. The source index 611 and destination index 612 are concatenated to produce an 18 bit address used to access an index array 613. The output of the index array is supplied to registers 614 for establishing filter control parameters. The filter control parameters from register 614 are supplied on line 615 to filter control logic 616. Other inputs to the filter control logic include the match result register 610, a conflicts default register 617 which is described below, and an address type register 618. The address type register indicates whether the destination address on line 603 is a unicast or a multicast address.

The NIC also includes registers for storing assigned MAC addresses for channels A and B referred to as MAC A 620 and MAC B 621. Coupled with these registers are respective comparators 622 and 623, which compare the incoming destination address on line 603 with the stored assigned MAC addresses for the respective paths A and B. The results of these matches are used to determine whether to pass the incoming packet to the respective channels as indicated on line 624 and 625. If match line 624 NOR match line 625 is asserted, as indicated by the output of NOR gate 626 in the figure, then the address filtering logic including the counters and the logic 616 are enabled.

The NIC is designed to hold 510 MAC addresses in address list RAMs 605, and to have a matched address pair lookup table 613 that contains entries for each matched source and destination pair, plus entries for default cases and cases where there is one address match but not the other. This is done by having a 512×512 index array 613. Smaller or larger NIC designs could also be done, with the most optimal implementations being an address list of $2^n-2$ and an array size of $(2^n)^2$. The following constants are used when describing entries in the array. The first two are the indexes of the first and last entry in the address list, and the second two are for entries in the array to deal with default and no match cases:

$$Index_{min} = 0$$
$$Index_{max} = 509$$
$$Index_{default} = 510$$
$$Index_{miss} = 511$$

The NIC has two external address ports for assigning unique MAC addresses to registers 620 and 621 during the manufacturing process. These addresses are available to the programmer as two 48 bit read-only registers:

$MAC_A$ $MAC_B$

The device has an internal programmable array 605 of 510×48 bit MAC addresses.

$AddressList[Index_{min}\ldots Index_{max}]$

There is also a set of 24 bit source match and a set of 24 bit destination match non-overflowing counters (not shown), used for statistics. These are incremented each time an address comparison succeeds, and are accessible by upper layers of the computer.

In order to speed up processing time, the AddressList array is actually implemented as 16 different 32×48 bit memory cells 605, each with two comparators 608, 609 for source and destination:

$$\text{Count}_{src}[\text{Index}_{min} \ldots \text{Index}_{max}]$$

$$\text{Count}_{dst}[\text{Index}_{min} \ldots \text{Index}_{max}]$$

As each packet is received, the source and destination addresses of the packet are each compared to each entry in the array. If a match occurs, a 9 bit index register (611 or 612) is set with the number (0 ... 509) of the array the match was found in, otherwise the register is set to 511 to signify that no match was found. The two registers for source and destination matches are:

$$\text{Index}_{src}$$

$$\text{Index}_{dst}$$

In addition there is a single 2 bit register "AddressMatch" 610 which is used to signify whether a match occurred. Its values are:

0=No match for either address found in AddressList[]

1=source address matched only

2=destination address matched only

3=both address-matched

The destination address of each packet is examined and its type is noted in a 1 bit boolean register "fMultiCast" 618, whose values are defined as follows:

FALSE (0) =unicast address

TRUE (1) =multicast address

After the source and destination index registers are loaded, they are used to access five 4 bit data cells from an external 256K×4 bit memory chip 613. This chip 613 is addressed using the combined 18 bits of the two index registers 611, 612 ($2^9 * 2^9 = 512*512 = 262144 = 256K$). The external memory is referred to as:

MatchArray[0 ... 511, 0 ... 511].$_A$ (lower two bits of each 4 bit memory cell)

MatchArray[0 ... 511, 0 ... 511].$_B$ (upper two bits of each 4 bit memory cell)

The five 4 bit data cells returned are stored in ten 2-bit registers 614 whose entries correspond to locations in MatchArray and two global default registers 650. The first two are used for the cell containing an address pair match:

$$\text{Match}_{SD.A} = \text{MatchArray}[\text{Index}_{src}, \text{Index}_{dst}]_A$$

$$\text{Match}_{SD.B} = \text{MatchArray}[\text{Index}_{src}, \text{Index}_{dst}]_B$$

The Matchs$_{SD.A}$ and Match$_{SD.B}$ registers are defined as follows:

| | |
|---|---|
| 0 (00) | Empty (i.e., use defaults) |
| 1 (01) | Undefined |
| 2 (10) | Pass packet |
| 3 (11) | Block packet |

The next four registers are used as default control values when both source and destination address matches occur, but the Match$_{SD.A}$ and/or Match$_{SD.B}$ registers are "Empty". They are:

$$\text{Match}_{SD.Src.A} = \text{MatchArray}[\text{Index}_{src}, \text{Index}_{default}]_A$$

$$\text{Match}_{SD.Dst.A} = \text{MatchArray}[\text{Index}_{default}, \text{Index}_{dst}]_A$$

$$\text{Match}_{SD.Src.B} = \text{MatchArray}[\text{Index}_{src}, \text{Index}_{default}]_B$$

$$\text{Match}_{SD.Dst.B} = \text{MatchArray}[\text{Index}_{default}, \text{Index}_{dst}]_B$$

The next two registers are used for determining action when a match of the source address occurs but not the destination address:

$$\text{Match}_{S.A} = \text{MatchArray}[\text{Index}_{src}, \text{Index}_{miss}]_A$$

$$\text{Match}_{S.B} = \text{MatchArray}[\text{Index}_{src}, \text{Index}_{miss}]_B$$

The last two registers are used for a match of the destination address but not the source address:

$$\text{Match}_{D.A} = \text{MatchArray}[\text{Index}_{miss}, \text{Index}_{dst}]_A$$

$$\text{Match}_{D.B} = \text{MatchArray}[\text{Index}_{miss}, \text{Index}_{dst}]_B$$

Two programmable 2 bit registers 650 are used to determine a packer's disposition if neither the source or destination addresses in the packet are found:

$$\text{Match}_{xx.A}$$

$$\text{Match}_{xx.B}$$

With the exception of the first two control registers defined above (Match$_{SD.A}$ and Match$_{SD.B}$), all of the Match control registers are defined as follows:

| | |
|---|---|
| 0 (00) | Pass packet |
| 1 (01) | Block packet if it is a Unicast and Pass if it is a Multicast |
| 2 (10) | Pass packet if it is a Unicast and Block if it is a Multicast |
| 3 (11) | Block packet |

When both source and destination addresses are matched and MatchArray[Index$_{src}$,Index$_{dst}$] is not Empty, then the decision to block or pass the packet is always made based on the contents of the entry in MatchArray. If the entry for the source and destination pair is empty, then a conflicts default register 651 is used to pick which address has precedence in case the actions for each address are different. To resolve these conflicts between pass and block instructions based on source and destination addresses, four default registers 651 are used. The registers are:

$$\text{fUseDst.}_{U.A}$$

$$\text{fUseDst.}_{U.B}$$

$$\text{fUseDst.}_{M.A}$$

$$\text{fUseDst.}_{M.B}$$

The two $_U$ registers are used if the destination packet is a UniCast (fMultiCast=FALSE), and the two $_M$ registers are used if the destination packet is a MultiCast (fMultiCast= TRUE). The two $_A$ registers are for the first DLL interface, and the two $_B$ are for the second DLL interface. In this case where both addresses are matched, but the match cell is empty, the fUseDst is used to determine which address has priority. If fUseDst$_{SD}$ is TRUE, then the entry Match$_{SD,dst}$ (from MatchArray[510,Index$_{dst}$]) is used, and if fUseDst$_{SD}$ is FALSE, then the entry Match$_{SD,src}$ (from MatchArray [Index$_{src}$,510]) is used.

If only the source address matches then Match$_{S,n}$ (=MatchArray[Index$_{src}$,511]$_n$) is used, and if only the destination address matches then Match$_{D,n}$ (=MatchArray[511, Index$_{dst}$]$_n$) is used.

In the case where no match is found, the Match$_{xx,A}$ and Match$_{xx,B}$ default registers 650 are used to determine a packet's disposition. A summary of the registers, arrays, and constants is contained in Table 2.

BRouter Design

Using the NIC described above with reference to FIG. 14, the following is a description of a very high performance integrated IS/ES computer. Virtual DLL and data path A of the NIC and allocated to the IS portion of the computer, and virtual DLL and data path B are allocated to the ES portion of the device.

The list of MAC addresses (605) is initialized so that all entries are "Empty":

```
FOR a = Index_min to Index_max DO;
    AddressList[a] = 0;
    Count_src[a] = 0;
    Count_dat[a] = 0;
    END;
```

The IS portion of the computer is assigned to virtual DLL A, reserve table entry 0 for it, and assign it its own unique MAC address:

```
AddressList[0]=MAC_A;
```

The Match Array is initialized so that all matched pair entries are configured as "Empty" for the IS module:

```
FOR s = Index_min to Index_max DO;
    FOR d = Index_min to Index_max DO;
        MatchArray[s,d]A = 0;  /* Make all entries "Empty" for
                                  IS */
    END;
END;
```

Configure the MatchArray 613 so that any packet with destination address MAC$_A$ will always be passed to the IS module, and any packets originating from the IS module (source address =MAC$_A$) will be blocked from being received by the IS:

```
MatchArray[511,0]_A = 0;    /* pass on data path A all packets with
                                destination address MAC_A */
MatchArray[0,511]_A = 3;    /* block on data path A all packets with –
                                source address MAC_A */
```

The second address entry in the table 605 is that of the ES (DLL B), and the IS module on DLL A treats that address as a local computer on the LAN, and thus blocks any packet with that MAC address as a destination. If both the source and destination addresses are in the table we do not need to learn the source address, and decide action based on the destination address:

```
Match_xx.A = 0;        /* unknown source and destination address: pass
                          always */
fUseDst._U.A = 0;
fUseDst._M.A = 0;      /* Decide based on source address if both are in table
                          and table entry is Empty */
```

The ES module's MAC address is treated as a local computer on the LAN, and the array is configured so that packets from other computers to the ES module (with MAC$_B$ destination address) are blocked.

Packets from the ES module will be passed if learned.

Every time the IS module learns a new address that it wants to block or pass as a result of, an array entry is made. In the cases where either the source or destination addresses are unknown, we pass the packet to the IS module for processing:

```
FOR i = 1 to 510
    MatchArray[i,511]_A = 0;
    MatchArray[511,i]_A = 0;    /* pass packet */
    END;
```

The IS module is initially programmed as a standard BRouter and receives all multicasts, all packets with unknown destination addresses (to forward to other LANs), and all packets with unknown source addresses (to make note of that new source address as being on the local LAN). In addition, any Unicast packets with destination address MAC$_A$ will always be passed to the IS module, and all packets originating from the IS module (source address= MAC$_A$) will be blocked from being received by the IS module.

```
Match_{xx.A} = 0;    /* Packets with neither source nor destination
                        addresses in table are always passed*/
MatchArray[Index_{default},0]_A = 0;
MatchArray[Index_{miss},0]_A = 0;    /*Pass on data path A all packets with
                                        destination address MAC_A    */
MatchArray[0,Index_{default}]_A = 3;
MatchArray[0,Index_{miss}]_A = 3;    /*Block on data path A all packets with
                                        source address MAC_A    */
For i = 2 to Index_{max} DO;
    MatchArray[Index_{default},i]_A = 1;
    MatchArray[i,Index_{default}]_A = 1;
    END;       /*Initialize tables so that the default is to block
                 packets in which both source and destination are in
                 the table unless they are multicasts    */
FOR i = 2 to Index_{max} DO;
    MatchArray[Index_{miss},i]_A = 0;
    MatchArray[i,Index_{miss}]_A = 0;
    END;       /*Initialize tables so that the default is to pass
                 packets in which either source or destination address
                 is not in the table    */
fUseDst._{U.A} = 1;
fUseDst._{M.A} = 1;    /*Decide based on default destination address entry
                         if both source and destination addresses are in table
                         but table entry is empty   */
```

When an address or address pair is to be added or removed from the table, it will typically be one of the 25 following cases:

1) A new MAC address of a computer on the local LAN was discovered by seeing a new source address (MAC-$_{new}$) in a packet. In this case the IS module wants to block all packets with this destination address. If the address table AddressList[] is full, an older entry will have to be removed using an aging algorithm of some kind. After that is accomplished if necessary and the location in the table determined (Index$_{new}$), the NIC is initialized for that entry as follows:

```
AddressList[Index_{new}] = MAC_{new};
Count_{src}[Index_{new}] = 1;
Count_{dst}[Index_{new}] = 1;    /*add new MAC address to table and set use
                                   counters to show non-empty entry   */
MatchArray[Index_{default},Index_{new}]_A = 3;   /*Block packets in which
                                                   both source and destination are in the
                                                   table and the destination is this new
                                                   address    */
MatchArray[Index_{miss},Index_{new}]_A = 0;
MatchArray[Index_{new},Index_{miss}]_{A = 0};    /*Pass packets with unknown
                                                   source address and new destination
                                                   address of with unknown destination
                                                   address and this new source address*/
FOR i = Index_{min} to Index_{max} DO;
    MatchArray[i,Index_{new}]_A = 0;
    MatchArray[Index_{new},i]_A = 0;
    END;       /*Make all of the matched pair entries
                 for this address "empty" */
```

2) Occasionally a multicast (MAC$_{mc}$) will be desired to be blocked by the network administrator. After finding an entry (Index$_{new}$) as above, this is done as follows:

```
AddressList[Index_{new}] = MAC_{mc};
Count_{src}[Index_{new}] = 1;
Count_{dst}[Index_{new}] = 1;    /*add new MAC address to table and set use
                                   counters to show non-empty entry   */
MatchArray[Index_{default},Index_{new}]_A = 3;   /*Block packets in which
                                                   both source and destination are in the table
                                                   and the destination is this multicast   */
```

```
MatchArray[Index_miss,Index_new].A = 0;  /*Pass packets with unknown
                                           source address so that they can be learned
                                           */
For i = Index_min to Index_max DO;
    MatchArray[i,Index_new].A = 0;
    MatchArray[Index_new,i].A = 0;
    END;         /*Make all of the matched pair entries for this address
                   "empty"    */
```

3) Occasionally a network administrator wishes to see all packets to or from a particular computer ($MAC_{computer}$) in order to do network protocol analysis. After finding the existing entry ($Index_{computer}$) for the computer or a new entry as above, this is done as follows:

```
AddressList[Index_computer] = MAC_computer;
Count_src[Index_computer] = 1;
Count_dst[Index_computer] = 1;   /*add new MAC address to table and
                                   set use counters to show non-empty
                                   entry       */
MatchArray[Index_default,Index_new].A = 0;
MatchArray[Index_new,Index_default].A = 0;
MatchArray[Index_miss,Index_new].A = 0;
MatchArray[Index_new,Index_miss].A = ;     /*Pass packets to or from the
                                             computer    */
FOR i = Index_mix to Index_max DO;
    MatchArray[i,Index_new].A = 0;
    MatchArray[Index_new,i].A = 0;
    END;            /*Make all of the matched pair entries
                      for this address "empty" */
```

We assign the ES portion of the computer to virtual DLL B, reserve table entry 1 for it, and assign it its own unique MAC address, with an entry in the address list for it:

```
AddressList[1]=MAC_B;
```

The Match Array is initialized so that all matched pair entries are configured as "Empty":

```
FOR s = Index_min to Index_max DO;
```

-continued
```
    FOR d = Index_min to Index_max DO;
        MatchArray[s,d].B = 0;    /*   Make all entries "Empty"
```

-continued
```
                               for ES       */
        END;
    END;
```

The ES portion of the computer is configured to receive only unicasts with its destination address and to receive all multicasts. Any Unicast packets with destination address $MAC_B$ will always be passed to the ES module, any Multicast packets will be passed to the ES module, and all packets originating from the ES module (source address= $MAC_B$) will be blocked from being received by the ES:

```
Match_xx.B = 1;               /*   Packets with neither source nor
                                   destination addresses in table are passed only
                                   if they are multicasts    */
MatchArray[Index_default,1].B = 0;
MatchArray[Index_miss,1].B = 0;     /*Pass on data path B all packets with
                                      destination address MAC_B*/
MatchArray[1,Index_default].B = 3;
MatchArray[1,Index_miss].B = 3;     /*Block on data path B all packets with
                                      source address MAC_B*/
For i = 2 to Index_max DO;
    MatchArray[Index_default,i].B = 1;
    MatchArray[Index_miss,i].B = 1;
    MatchArray[i,Index_default].B = 1;
    MatchArray[i,Index_miss].B = 1;
    END;              *Block packets not directed at ES unless they
                       are Multicasts */
fUseDst.U.B = 0;
fUseDst.M.B = 1;      /*Decide based on source address entry for
                        unicasts and on destination address for
                        multicasts if both source and destination
                        addresses are in table but table entry is
                        empty     */
```

The special cases of a unicast from the ES to the IS (B to A) or from the IS to the ES (A to B) are handled with entries in the matched pair table:

| | |
|---|---|
| MatchArray[0,1]$_A$ = 3; | /* block data from A to B from going back to A */ |
| MatchArray[0,1]$_B$ = 2; | /* pass data from A to B */ |
| MatchArray[1,0]$_A$ = 2; | /* block data from B to A from going back to B */ |
| MatchArray[1,0]$_B$ = 3; | /* pass data from B to A */ |

V. Multi-Media Network Interface Controller

The present invention is also useful in multi-media systems, which have unique data handling problems. There are two main types of multi-media applications, stored data (i.e., those that retrieve stored images and audio for playback) and real-time (i.e., those that display an image or generate sound as it is being recorded at another location). Audio data and image data are termed multi-media data herein.

For both applications, the three main parameters relative to the network interface controller are throughput, latency, and buffer size. If a network has enough throughput, then the latency and buffer size parameters become the dominant factors.

Audio typically requires 4K to 64K bits per second depending on quality. Video typically requires 64K to 512K or more bits per second depending on quality.

Ethernet has a maximum throughput of 5 Mbps (millions of bits per second), or about half of its 10 Megabit nominal speed. Similarly, token ring has either 2 Mbps (4 Megabit speed) or 8 Mbps (16 Megabit) depending on the version of TokenRing used. Any of these media types have enough bandwidth for multi-media for some number of users greater than one. For example, with an audio-visual multi-media application using data rates of 256K bps, an Ethernet local area network (LAN) could have up to 20 simultaneous users (5 Mbps/256 Kbps=20) per lAN segment.

Since LANs are shared services, the time it takes for data to be transferred from one machine to another is not a fixed time. The data transfer time over a LAN is examined in terms of mean time to transfer ±2 standard deviations (±2 SD), and applications must build in a fixed time delay that is equivalent to this maximum time or else the data delays will result in unpleasant breaks in the sound or video. This delay requires buffers to be allocated of a size equal to the delay time multiplied by the data rate. By reducing the latency, stored data applications require less memory, and real-time applications can be done with minimal time delay.

There are a number of factors which add latency in a system, including transfer time from recording device (real-time) or disk drive (stored-data), software time encapsulating data, protocol routing and link level interface software time, MAC queuing time, time waiting for shared media to become free, physical media transfer time, receiving MAC transfer time, queuing time, software time spent in link level interface, software protocol processing, application time handling the data, and device driver time displaying or replaying the data.

All of these factors must be minimized for real-time multi-media to be viable. This invention is a solution for the network interface controller to significantly reduce the amount of time (latency) needed to transmit or receive multi-media data.

Figure 15:
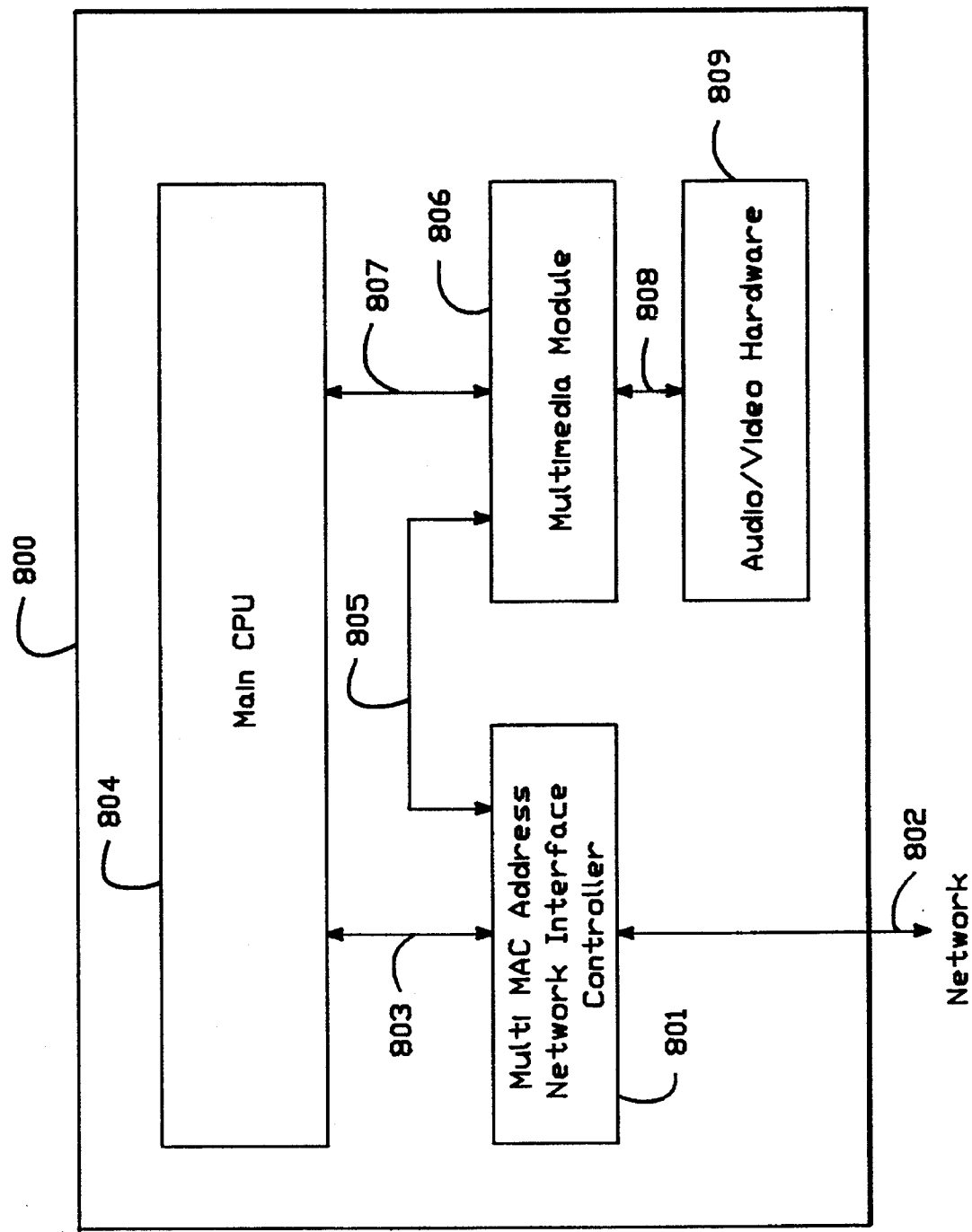
FIG. 15 is an overview block diagram of a multi-media system using the multiple MAC address interface controller according to the present invention.

FIG. 15 illustrates a multi-media system 800 which takes advantage of a multiple MAC address network interface controller 801 according to the present invention. The network interface controller 801 is coupled to a network across line 802. A first interface of the network interface controller is coupled across line 803 to a main CPU 804. A second interface of the network interface controller is coupled across line 805 to a multi-media module 806. The multi-media module also communicates with the main CPU across line 807. The multi-media module particularly serves the function of routing audio and video data across line 808 to audio/video hardware 809.

By using a separate unique MAC address and data channel for the multi-media module of a computer, video and audio data can be processed without software overhead, greatly reducing latency. Audio/video data can be sent directly without protocol headers, if the session is local, or with minimal protocol overhead if the data is routed from another network.

Figure 16:
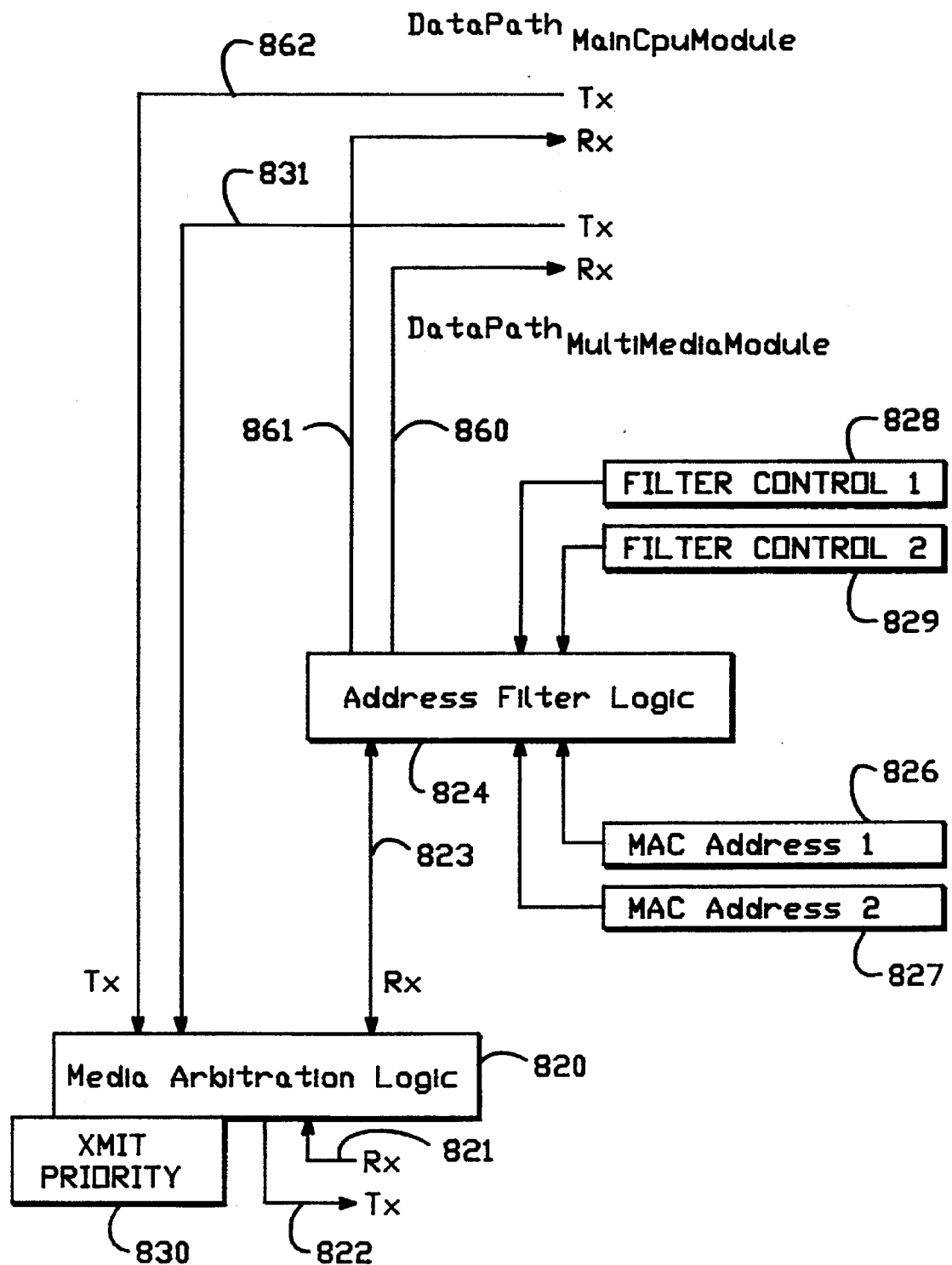
FIG. 16 is a schematic diagram of the network interface controller used in the multi-media system of FIG. 15.
Figure 17:
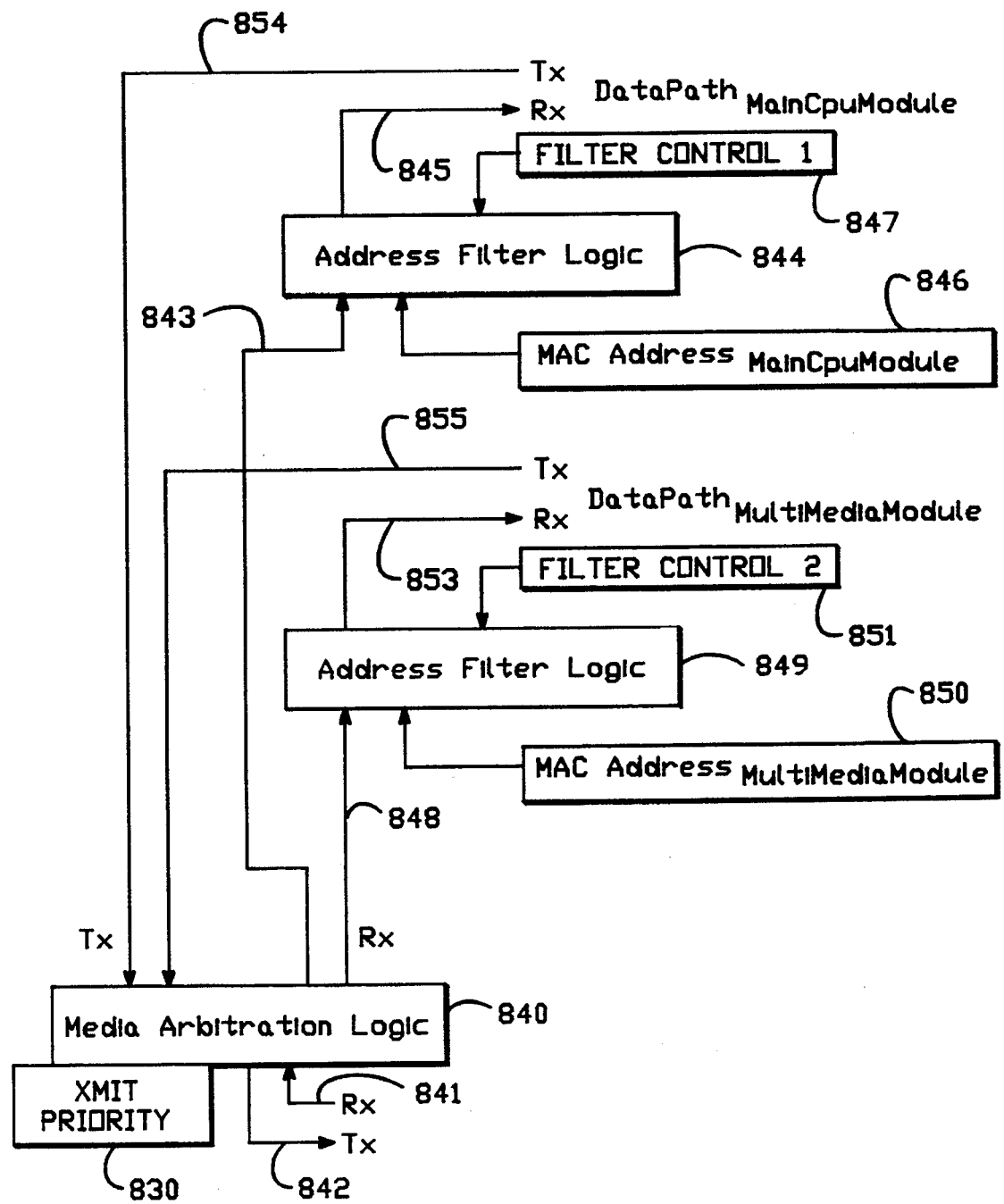
FIG. 17 is a schematic block diagram of an alternative implementation of the network interface controller in the multi-media system of FIG. 15.

Two alternate implementations of the interface controller 801 are shown in FIGS. 16 and 17. In the embodiment of FIG. 16, media arbitration logic 820 is coupled to the network across a receive line 821 and a transmit line 822. Received data is supplied through the media arbitration logic 820 across line 823 to address filter logic 824. The address filter logic 824 has associated with it a first assigned MAC address 826 for the main CPU module and a second assigned MAC address 827 for the multi-media module. Data for the multi-media module is supplied on line 860 and data destined for the main CPU module is supplied on line 861 to the respective recipients.

Data transmitted from the main CPU is supplied on line 862 to the media arbitration logic 820. Similarly, data transmitted from the multi-media module is supplied on line 831 to the media arbitration logic 820. Transmit priority logic 830 is provided with the arbitration circuit, which favors transmissions by the multi-media module, as explained more fully below.

In the design shown in FIG. 16, there is a single Address Filter Logic section which, based on the destination MAC address in a received packet, passes data on one, both, or neither data path depending on the MAC address. The controller has two control registers, FilterControl 828, 829, one for each data path. Each of the two control registers have the following values defined:

| | |
|---|---|
| 0 | pass no packets |
| 1 | pass only unicast packets in which the destination address matches the unique MAC address assigned to the data path |
| 2 | pass only multicasts |
| 3 | pass unicasts which have correct destination MAC address and all multicasts |
| 4 | pass all packets (promiscuous mode) |

The computer would normally be initialized by setting FilterControl 828 for the Main CPU Module =3 and FilterControl 829 for the Multi-Media Module =1.

The alternate implementation shown in FIG. 17 has two duplicate single unique MAC address filter logic modules 844 and 845, one for the Main CPU module and one for the Multi-media module, respectively. This distributed address filter implementation is simpler to design and test but requires more gates to implement in the ASIC.

Thus, as can be seen in FIG. 17, the alternative version includes a media arbitration logic 840 which has a receive input on line 841 and a transmit output on line 842 coupled to the network. A first receive output is supplied on line 843 to address filter logic 844 for the main CPU. The output of the address filter logic is supplied on line 845 to the main CPU. The address filter logic 844 is coupled to a first register 846 which stores a first unique MAC address for the main CPU module. In addition, it is coupled to a register 847 which stores the filter control parameters as described above.

A second output of the media arbitration logic 840 is supplied on line 848 to address filter logic 849 for the multi-media module. Address filter logic 849 is coupled to a register 850 which stores a second unique MAC address for the multi-media module. In addition, the address filter logic 849 is coupled to a register 851 which stores the filter control parameter for this second path. The output of the address filter logic 849 is supplied on line 853 to the multi-media module.

Transmitted data from the CPU module is supplied on line 854 to the media arbitration logic 840. Transmitted data from the multi-media module is supplied on line 855 to the media arbitration logic 840.

There are two corresponding versions of the Media Arbitration Logic which differ only in the number of receive lines to the address filter or filters. In addition to the receive on transmit and media arbitration logic described elsewhere in this application, both versions have a transmit priority circuit, 830 (in both FIGS. 16 and 17), allowing a multi-media packet to interrupt a packet from the main CPU in order to lower latency on the transmit side. This is done by checking to see the number of bytes left to be transmitted, and if greater than the number of bytes in register TransmitPriorityLength, the packet in transmission is stopped, collision is generated for the required time, and then the multi-media packet is sent. This logic is controlled with a register, TransmitPriority, which has values defined as follows:

| | |
|---|---|
| 0 | equal priority on both data paths (i.e., no interruption of transmission ever occurs based on priority) |
| 1 | Main CPU module has priority over Multi-Media module |
| 2 | Multi-media module has priority over Main CPU module |

Thus, a unique multi-media system is provided which allows sophisticated communication protocol handling in a main CPU, but significantly minimizes the latency involved in such processing for audio and visual data directed to or from a specific multi-media module. This system further demonstrates the flexibility of the multiple MAC address network interface controller design using virtual data link layer interfaces to independent processing modules with a single connection to the network according to the present invention.

VI. Conclusion

In sum, the present invention provides a data link layer device having multiple network addresses, which is capable of address blocking and passing functions based on this set of multiple network addresses, rather than a single assigned address. The device presents virtual data link layers to upper level-software responsive to the respective assigned MAC addresses in the data link layer device. This allows upper layer software to take advantage of the multiple MAC addresses, by simplifying the processing. Furthermore, there is much reduced frame traffic in the main processor of the computer because of the enhanced filtering techniques available to the multiple MAC data link layer devices.

Accordingly, a new network interface controller has been provided taking advantage of the multiple MAC address invention, and a high performance multi-function computer system utilizing the virtual data link layers, and integrated end system/integrated system computer have been provided which greatly advance over the prior art.

The foregoing description of preferred embodiments of the present invention has been provided for the purposes of illustration and description. It is not intended to be exhaustive or to limit the invention to the precise forms disclosed. Obviously, many modifications and variations will be apparent to practitioners skilled in this art. The embodiments were chosen and described in order to best explain the principles of the invention and its practical application, thereby enabling others skilled in the art to understand the invention for various embodiments and with various modifications as are suited to the particular use contemplated. It is intended that the scope of the invention be defined by the following claims and their equivalents.

TABLE 1

```
FOR n = A,B DO;
  IF AddressMatch = 3 THEN DO;
    IF Match_{SD.n} = 2 THEN DO;
      {pass packet on data path n};
    END:
    ELSEIF Match_{SD.n} = 3 THEN DO
      {block packet on data path n};
    END;
    ELSE DO;
      IF fMulticast THEN;
        IF fUseDst_{M.n} THEN;
          IF Match_{SD.src.n} = 0 OR Match_{SD.src.n} = 1
            THEN {pass packet on data path n};
            ELSE {block packet on data path n};
        ELSE;
          IF Match_{SD.dst.n} = OR Match_{SD.dst.n} = 1
            THEN {pass packet on data path n};
            ELSE {block packet on data path n}
      ELSE
        IF fUseDst_{U.n} THEN;
          IF Match_{SD.src.n} = 0 OR Match_{SD.src.n} = 2
            THEN {pass packet on data path n};
            ELSE {block packet on data path n};
        ELSE;
          IF Match_{SD.dst.n} = 0 OR Match_{SD.dst.n} = 2
            THEN {pass packet on data path n};
            ELSE {block packet on data path n};
      END;
    END;
  ELSEIF AddressMatch = 1 THEN DO;
    IF  (Match_{S.n} = 0) OR
        (fMulticast AND (Match_{S.n} = 1)) OR
        (NOT(fMulticast) AND (Match_{S.n} = 2))
      THEN {pass packet on data path n};
      ELSE {block packet on data path n};
  END;
  ELSEIF Address Match = 2 THEN DO;
    IF  (Match_{D.n} = 0) OR
        (fMulticast AND (Match_{D.n} = 1)) OR
        (NOT(fMulticast) AND (Match_{D.n} = 2))
      THEN {pass packet on data path n};
      ELSE {block packet on data path n};
  END;
  ELSEIF AddressMatch = 0 THEN DO;
    IF  (Match_{xx.n} = 0) OR
        (fMulticast AND (Match_{xx.n} = 1)) OR
        (NOT(fMulticast) AND (Matchxx.n = 2))
      THEN {pass packet on data path n};
      ELSE {block packet on data path n};
  END;
END;
```

TABLE 2

Constants $Index_{min} = 0$
$Index_{max} = 509$
$Index_{default} = 510$
$Index_{miss} = 511$

TABLE 3

| | |
|---|---|
| AddressList[0 .. 509] | Array for 48 bit MAC addresses |
| $Count_{src}$[0 .. 511] | 24 bit counter for each MAC address in AddressList[ ], non overflowing, incremented every time a source address matches. Entry $Count_{dst}$[510] is also incremented for every packet address match, and Entry $Count_{dst}$[511] is incremented whenever no match is found. |
| $Count_{dst}$[0 .. 511] | 24 bit counter for each MAC address in AddressList[ ], non overflowing, incremented every time a destination address matches. Entry $Count_{dst}$[501] is also incremented for every packet address match, and Entry $Count_{dst}$[511] is incremented whenever no match is found. |
| MatchArray[0..511,0..511]$_A$ | 512X512X2 bit array for virtual DLL A, with values interpreted as defined below for "Match..." registers. |
| MatchArray[0..511,0..511]$_B$ | 512X512X2 bit array for virtual DLL B, with values interpreted as defined below for "Match..." registers. |
| fUseDst.$_{U.A}$ | Flag for determining which default values to use for a Unicast when both source and destination addresses are matched in AddressList[ ], but the MatchArray[i,j] entry is "empty. See also the descriptions for Match$_{SD.Src.A}$ and Match$_{SD.Dst.A}$. |
| fuseDst.$_{U.B}$ | Same as fUseDst.$_{U.A}$ but for virtual DLL B. |
| fUseDst.$_{M.A}$ | Same as fUseDst.$_{U.A}$ but for multicasts. |
| fUseDst.$_{M.B}$ | Same as fUseDst.$_{M.A}$ but for virtual DLL B. |
| Match$_{xx.A}$ | Control register to handle case where neither source nor destination address are found in AddressList[ ]. Values are defined as:<br>0(00) Pass packet<br>1(01) Block packet if Unicast and Pass if Multicast<br>2(10) Pass packet if Unicast and Block if Multicast<br>3(11) Block packet |
| Match$_{xx.B}$ | Same as Match$_{xx.A}$ but for virtual DLL B. |

| | |
|---|---|
| MAC$_A$ | External unique MAC address for Virtual DLL A |
| MAC$_B$ | External unique MAC address for Virtual DLL B |
| fMultiCast | Values:<br>0 Unicast<br>1 Multicast |
| Index$_{src}$ | Value from 0 to 511 denoting the index in AddressList[ ]of the address which matches the source address in the packet. A value of 510 is never returned, and a value of 511 means that no match occurred. |
| Index$_{dst}$ | Same as Index$_{src}$ but for destination address |
| AddressMatch | 2 bit register loaded after packet processing, with values defined as:<br>0(00) No match for either address found in AddressList[ ]<br>1(01) source address matched only<br>2(10) destination address matched only<br>3(11) both address matched |
| Match$_{SD.A}$ | Two bit register loaded from MatchArray[Indexsrc,Indexdst]A. Values returned are defined with values:<br>0(00) Empty (i.e., use defaults)<br>1(01) Undefined<br>2(10) Pass packet<br>3(11) Block packet |
| Match$_{SD.B}$ | Same as Match.SD.A, but for virtual DLL B. |
| Match$_{SD.Src.A}$ | Two bit register loaded from MatchArray [Index$_{src}$,Index$_{default}$]$_A$. Used when AddressMatch = 3 (matched pair found), Match SD.A = 0 ("empty"), and fUseDst.$_{U.A}$ = 0 (if Unicast) or fUseDst.$_{M.A}$ = 0 (if Multicast) (Use Source Address Default). Values returned are defined as:<br>0(00) Pass packet<br>1(01) Block if Unicast and Pass if Multicast<br>2(10) Pass packet if Unicast and Block if Multicast<br>3(11) Block packet |
| Match$_{Sd.Dst.A}$ | Two bit register loaded from MatchArray [Index$_{default}$,Index$_{dst}$]$_A$. Defined the same as Match$_{SD.Src.A}$ but with fUseDst.$_{U.A.}$ = 1 (if Unicast) or fUseDst.$_{M.A}$ = 1 (if Multicast). |
| Match$_{SD.Src.B}$ | Two bit register loaded from MatchArray[Index$_{src}$,Index$_{default}$]$_B$. Defined the same as Match$_{SD.Src.A}$ but for virtual DLL B. |
| Match$_{SD.Dst.B}$ | Two bit register loaded from MatchArray[Index$_{default}$,Index$_{dst}$]$_B$. Defined the same as Match$_{SD.Dst.A}$ but for virtual DLL B. |
| Match$_{S.A}$ | Two bit register loaded from MatchArray[Index$_{src}$,Index$_{miss}$]$_A$. Used when source address is matched in AddressList[ ] but not destination address. Values are defined the same as for Match$_{SD.Src.A}$. |
| Match$_{S.B}$ | Two bit register loaded from MatchArray[Index$_{src}$,Index$_{miss}$]$_B$. Same as Match$_{S.A}$ but for virtual DLL B. |
| Match$_{D.A}$ | Two bit register loaded from MatchArray[Index$_{miss}$,Index$_{dst}$]$_A$. Same as for Match$_{S.A}$ but for the case where destination address matches but not source address. |
| Match$_{D.B}$ | Two bit register loaded from MatchArray[Indexmiss,Indexdst]B. Same as Match$_{D.A}$ but for virtual DLL B. |

What is claimed is:

1. A computer system to be connected with a network transmission medium, the computer system comprising:

a network interface coupled to the network transmission medium, including at least a first processor interface having a first assigned network address and a second processor interface having a second assigned network address;

first processing resources coupled to the first processor interface which receive and transmit frames through the network interface; and second processing resources coupled to the second processor interface which receive and transmit frames through the network interface;

wherein the network interface includes:

a connector to transport data to and from the network transmission medium; and a medium access control device, coupled to the connector, to receive and transmit frames of data through the connector, the medium access control device including a first data channel to the first processor interface and a second data channel to the second processor interface, memory to store the first and second assigned network addresses, and address filtering logic, coupled to the first and second data channels and to the memory, which passes and blocks frames received through the connector for the first and second data channels in response to the assigned network addresses.

2. The system of claim 1, wherein the first and second processor interfaces include respective buffering and queuing structures for communication of data between the network transmission medium and the first and second processing resources.

3. The system of claim 1, wherein the memory further stores a plurality of additional network addresses in addition to the first and second assigned network addresses, and the address filtering logic includes circuits responsive the plurality of additional network addresses.

4. The system of claim 3, wherein frames include source and destination addresses, and the circuits responsive to the plurality of additional network addresses include logic for blocking a particular frame on at least one of the first and second data channels when the plurality of additional network addresses includes the source and destination addresses of the particular frame.

5. The system of claim 1, wherein the first and second processor interfaces comprise respective virtual data link layer interfaces.

6. The system of claim 1, further including at least one additional network interface coupled to the first processing resources, and wherein the first processing resources include network intermediate system functions, and the second processing resources include network management functions.

7. The system of claim 1, further including at least one additional network interface coupled to the first processing resources, and wherein the first processing resources include network intermediate system functions, and the second processing resources include network end system functions.

8. A computer system to be connected with a plurality of network transmission media, the computer system comprising:

a shared network interface including a connector coupled to a first network transmission medium, and including at least a first processor interface having a first assigned network address and a second processor interface having a second assigned network address;

a first processor coupled to the first processor interface, the first processor including network end system resources; and a second processor coupled to the second processor interface, the second processor including a second network interface coupled to a second network transmission medium and intermediate system resources for transporting frames between the shared and the second network interfaces for transmission across the first and second network transmission media;

wherein the shared network interface includes:

a medium access control device, coupled to the connector, to receive and transmit frames of data through the connector, the medium access control device including a first data channel to the first processor interface and a second data channel to the second processor interface, memory to store the first and second assigned network addresses, and address filtering logic, coupled to the first and second data channels and to the memory, which passes and blocks frames received through the connector for the first and second data channels in response to the assigned network addresses.

9. The apparatus of claim 8, wherein the intermediate system resources include routing adaptor functions.

10. The apparatus of claim 8, wherein the intermediate system resources include bridge functions.

11. The apparatus of claim 8, wherein the intermediate system resources include router functions.

12. The apparatus of claim 8, wherein the intermediate system resources include bridge and router functions.

13. The system of claim 8, wherein the first and second processor interfaces include respective buffering and queuing structures for communication of data between the network transmission medium and the first and second processing resources.

14. The system of claim 8, wherein the shared network interface includes address filtering logic which passes or blocks received transmissions for the first processor interface in response to the first assigned network address and which passes or blocks received transmissions for the second processor interface in response to the second assigned network address.

15. The system of claim 8, wherein the memory further stores a plurality of additional network addresses in addition to the first and second assigned network addresses, and the address filtering logic includes circuits responsive the plurality of additional network addresses.

16. The system of claim 15, wherein frames include source and destination addresses, and the circuits responsive to the plurality of additional network addresses include logic for blocking a particular frame on at least one of the first and second data channels when the plurality of additional network addresses includes the source and destination addresses of the particular frame.

17. A computer system to be connected with a network transmission medium, the computer system comprising:

a shared network interface including a connector coupled to the network transmission medium, and including at least a first processor interface having a first assigned network address and a second processor interface having a second assigned network address;

a data processing unit coupled to the first processor interface which receives and transmits frames through the shared network interface for end system processes; and a multi-media unit coupled to the second processor interface which receives and transmits frames of multi-media data through the shared network interface for multi-media system processes;

wherein the shared network interface includes:

a medium access control device, coupled to the connector, to receive and transmit frames of data through the connector, the medium access control device including a first data channel to the first processor interface and a second data channel to the second processor interface, memory to store the first and second assigned network addresses, and address filtering logic, coupled to the first and second data channels and to the memory, which passes and blocks frames received through the connector for the first and second data channels in response to the assigned network addresses.

18. The system of claim 17, wherein the shared network interface includes transmit priority logic favoring the multi-media unit.

19. The system of claim 17, wherein the first and second processor interfaces include respective buffering and queuing structures for communication of data between the network transmission medium and the data processing unit and the multi-media unit.

20. The system of claim 17, wherein the shared network interface includes address filtering logic which passes or blocks received transmissions for the first processor interface in response to the first assigned network address and which passes or blocks received transmissions for the second processor interface in response to the second assigned network address.

21. A computer system to be connected with a network transmission medium, the computer system comprising:

a shared network interface including a connector coupled to the network transmission medium, and including at least a first processor interface having a first assigned network address and a second processor interface having a second assigned network address;

a data processing unit coupled to the first processor interface which receives and transmits frames through the shared network interface for end system processes; and a routing adaptor unit, having a first port coupled to the second processor interface which receives and transmits frames of data through the shared network interface, and a second port adapted for a communication link to a remote system, and including resources to forward frames received through the first port having the second assigned network address to the second port and to forward frames received through the second port and not having the second assigned network address to the first port;

wherein the shared network interface includes:

a medium access control device, coupled to the connector, to receive and transmit frames of data through the connector, the medium access control device including a first data channel to the first processor interface and a second data channel to the second processor interface, memory to store the first and second assigned network addresses, and address filtering logic, coupled to the first and second data channels and to the memory, which passes and blocks frames received through the connector for the first and second data channels in response to the assigned network addresses.

22. The system of claim 21, wherein the first and second processor interfaces include respective buffering and queuing structures for communication of data between the network transmission medium and the data processing unit and between the network transmission medium and the routing adaptor unit.

23. The system of claim 21, wherein the shared network interface includes address filtering logic which passes or blocks received transmissions for the first processor interface in response to the first assigned network address and which passes or blocks received transmissions for the second processor interface in response to the second assigned network address.

* * * * *